United States Patent
Dabeer et al.

(10) Patent No.: US 11,489,628 B2
(45) Date of Patent: *Nov. 1, 2022

(54) GROUP ACKNOWLEDGEMENT/NEGATIVE ACKNOWLEDGEMENT AND TRIGGERING GACK/CHANNEL STATE INFORMATION

(71) Applicant: QUALCOMM Incorporated, San Diego, CA (US)

(72) Inventors: Onkar Jayant Dabeer, Redmond, WA (US); Aleksandar Damnjanovic, Del Mar, CA (US); Kiran Kumar Somasundaram, Bellevue, WA (US); Madhavan Srinivasan Vajapeyam, San Diego, CA (US); Hao Xu, Beijing (CN); Wanshi Chen, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,030

(22) Filed: Nov. 13, 2019

(65) Prior Publication Data

US 2020/0195382 A1  Jun. 18, 2020

Related U.S. Application Data

(60) Continuation of application No. 16/104,111, filed on Aug. 16, 2018, now Pat. No. 10,554,341, which is a
(Continued)

(51) Int. Cl.
*H04L 1/00* (2006.01)
*H04L 1/16* (2006.01)
(Continued)

(52) U.S. Cl.
CPC .......... *H04L 1/1621* (2013.01); *H04L 1/0073* (2013.01); *H04L 1/1614* (2013.01);
(Continued)

(58) Field of Classification Search
None
See application file for complete search history.

(56) References Cited

U.S. PATENT DOCUMENTS

| | | | |
|---|---|---|---|
| 5,872,777 A | 2/1999 | Brailean et al. | |
| 6,389,016 B1 | 5/2002 | Sabaa et al. | |

(Continued)

FOREIGN PATENT DOCUMENTS

| | | |
|---|---|---|
| CN | 1367964 A | 9/2002 |
| CN | 1380765 A | 11/2002 |

(Continued)

OTHER PUBLICATIONS

European Search Report—EP18191535—Search Authority—the Hague—Dec. 5, 2018.
(Continued)

*Primary Examiner* — Ayanah S George
(74) *Attorney, Agent, or Firm* — Arent Fox, LLP and Qualcomm, Incorporated

(57) ABSTRACT

According to the present disclosure, CSI and/or a plurality of ACKs related to a group of DL data transmissions may be buffered at the UE as a GACK until a DCI trigger is received from the eNB. Once the trigger is received, the UE may transmit the CSI and/or GACK to the eNB. In this way HARQ feedback and/or CSI may be reliably communicated while reducing payload. In an aspect of the disclosure, a method, a computer-readable medium, and an apparatus are provided. The apparatus send, to a UE, data transmissions associated with a first plurality of downlink subframes. In an aspect, the apparatus increments a counter for each data
(Continued)

transmission sent to the UE. In a further aspect, the apparatus transmits, to the UE, a first trigger for a first GACK when a counter is greater than or equal to a threshold.

25 Claims, 17 Drawing Sheets

Related U.S. Application Data division of application No. 15/002,072, filed on Jan. 20, 2016, now Pat. No. 10,148,392.

(60) Provisional application No. 62/108,487, filed on Jan. 27, 2015.

(51) Int. Cl.
*H04L 43/0823* (2022.01)
*H04L 1/12* (2006.01)

(52) U.S. Cl.
CPC .......... *H04L 1/1671* (2013.01); *H04L 1/1685* (2013.01); *H04L 43/0847* (2013.01); *H04L 2001/125* (2013.01)

(56) References Cited

U.S. PATENT DOCUMENTS

| | | | |
|---|---|---|---|
| 8,780,817 | B2 | 7/2014 | Farajidana et al. |
| 9,083,501 | B2 | 7/2015 | Luo et al. |
| 9,148,871 | B2 | 9/2015 | Wentink et al. |
| 9,584,287 | B2 * | 2/2017 | Seo .................. H04L 1/0026 |
| 10,148,392 | B2 | 12/2018 | Dabeer et al. |
| 2005/0058151 | A1 | 3/2005 | Yeh |
| 2008/0095252 | A1 | 4/2008 | Kim et al. |
| 2010/0311431 | A1 | 12/2010 | Papasakellariou et al. |
| 2011/0032925 | A1 | 2/2011 | Lee et al. |
| 2011/0103247 | A1 | 5/2011 | Chen et al. |
| 2012/0063523 | A1 * | 3/2012 | Jitsukawa ............ H04L 1/0035 375/259 |
| 2012/0127869 | A1 * | 5/2012 | Yin .................... H04L 5/001 370/252 |
| 2012/0127950 | A1 | 5/2012 | Chung et al. |
| 2012/0170524 | A1 | 7/2012 | Ren et al. |
| 2012/0243497 | A1 * | 9/2012 | Chung ............. H04W 72/1289 370/329 |
| 2013/0182566 | A1 | 7/2013 | Goergen et al. |
| 2013/0208695 | A1 * | 8/2013 | Jang .................. H04L 5/0053 370/330 |
| 2014/0314004 | A1 | 10/2014 | Zhou et al. |
| 2015/0319777 | A1 * | 11/2015 | Seo .................... H04W 74/006 370/330 |
| 2016/0127082 | A1 | 5/2016 | Razavi et al. |
| 2016/0192388 | A1 * | 6/2016 | Ekpenyong .......... H04L 5/0092 370/329 |
| 2016/0218832 | A1 | 7/2016 | Dabeer et al. |
| 2016/0218834 | A1 | 7/2016 | Bohn et al. |
| 2017/0048026 | A1 * | 2/2017 | Park .................. H04L 1/1864 |
| 2017/0318575 | A1 * | 11/2017 | Park .................. H04W 72/0446 |
| 2019/0007173 | A1 | 1/2019 | Dabeer et al. |
| 2019/0261361 | A1 * | 8/2019 | Xiong ................. H04W 72/02 |

FOREIGN PATENT DOCUMENTS

| | | |
|---|---|---|
| CN | 101379782 A | 3/2009 |
| CN | 101953106 A | 1/2011 |
| CN | 101978760 A | 2/2011 |
| CN | 103155482 A | 6/2013 |
| CN | 103237353 A | 8/2013 |
| JP | H05336194 A | 12/1993 |
| JP | 2008288719 A | 11/2008 |
| JP | 2014500685 A | 1/2014 |
| TW | 201444393 A | 11/2014 |
| WO | 0122645 A1 | 3/2001 |
| WO | 2009116759 A2 | 9/2009 |
| WO | 2010109521 A1 | 9/2010 |
| WO | 2011053970 A2 | 5/2011 |
| WO | 2011127098 A1 | 10/2011 |
| WO | 2012170583 A1 | 12/2012 |

OTHER PUBLICATIONS

IEEE Std 802.11e-2005, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications: Amendment 8: Medium Access Control (MAC) Quality of Service Enhancements", IEEE Computer Society, Nov. 11, 2005, pp. 98-99.
International Preliminary Report on Patentability—PCT/US2016/014368, the International Bureau of WIPO—Geneva, Switzerland, Aug. 1, 2017.
International Search Report and Written Opinion—PCT/US2016/014368—ISA/EPO—Jun. 29, 2016.
LG Electronics: "UL/DL Band Swapping for Efficient Support of Relays in FDD Mode", 3GPP TSG-RAN WG1#55, R1-084206, Nov. 2008, pp. 1-5, URL: http://www.3gpp.org/ftp/tsg_ran/WG1_RL1/TSGR1_55/Docs/R1-084206.zip.
Partial International Search Report—PCT/US2016/014368—ISA/EPO—Apr. 1, 2016.
Samsung: "HARQ-ACK and CSI Multiplexing in PUCCH for DL CA", 3GPP Draft, R1-113074, 3rd Generation Partnership Project (3GPP), Mobile Competence Centre, 650, Route Des Lucioles, F-06921 Sophia-Antipolis Cedex, France, vol. RAN WG1, No. Zhuhai, Oct. 10, 2011, Oct. 4, 2011 (Oct. 4, 2011), pp. 1-3, XP050538222, [retrieved on Oct. 4, 2011] the whole document.
Taiwan Search Report—TW105101922—TIPO—Jul. 23, 2019.
ZTE: "Consideration on Signaling for Two-Component Feedback", 3GPP Draft, R1-104558, 3rd Generation Partnership Project (3GPP), Mobile Competence Centre, 650, Route Des Lucioles, F-06921 Sophia-Antipolis Cedex, France, vol. RAN WG1, No. Madrid, Spain, Aug. 23, 2010, Aug. 17, 2010 (Aug. 17, 2010), pp. 1-9, XP050449855, [retrieved on Aug. 17, 2010] Section 4, p. 8.
Taiwan Search Report—TW109113568—TIPO—dated Jan. 25, 2021.

* cited by examiner

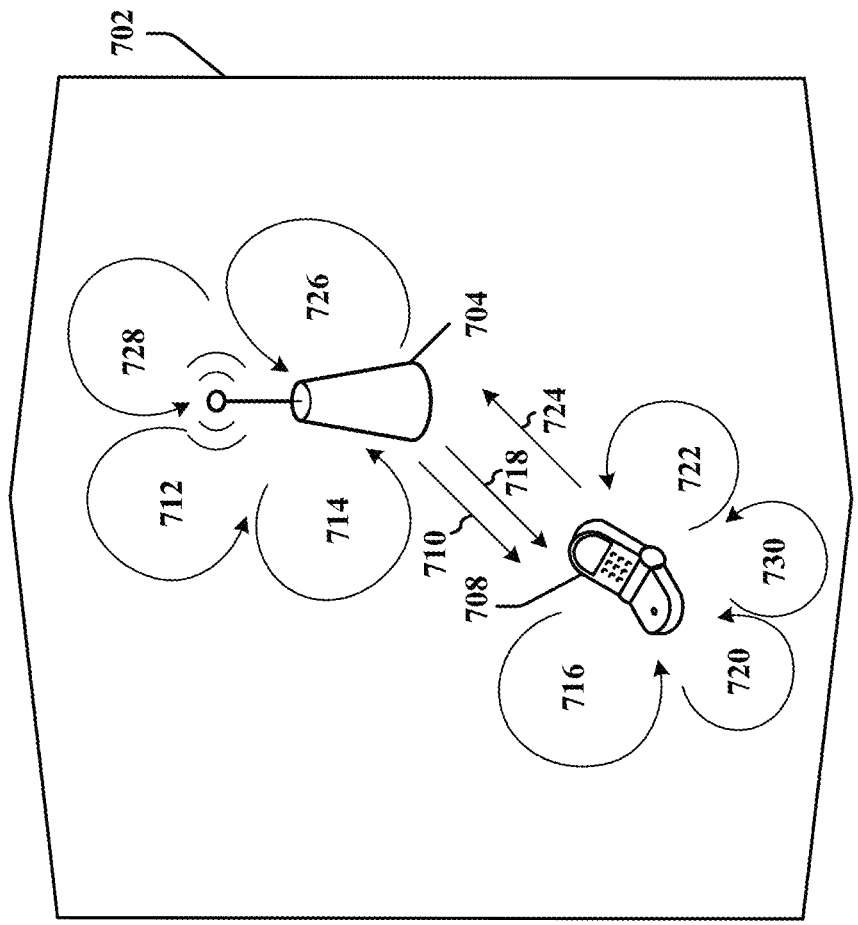
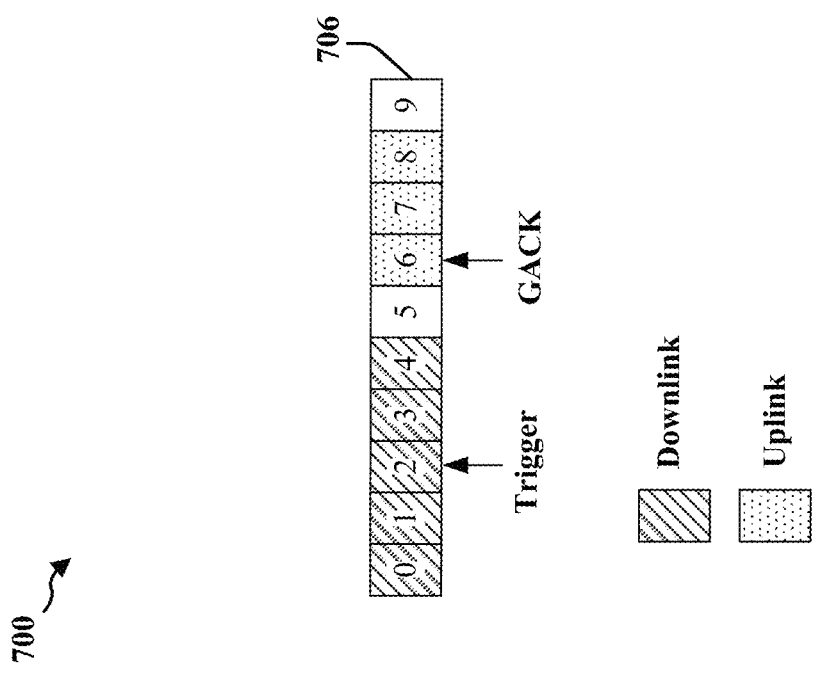
FIG. 4A

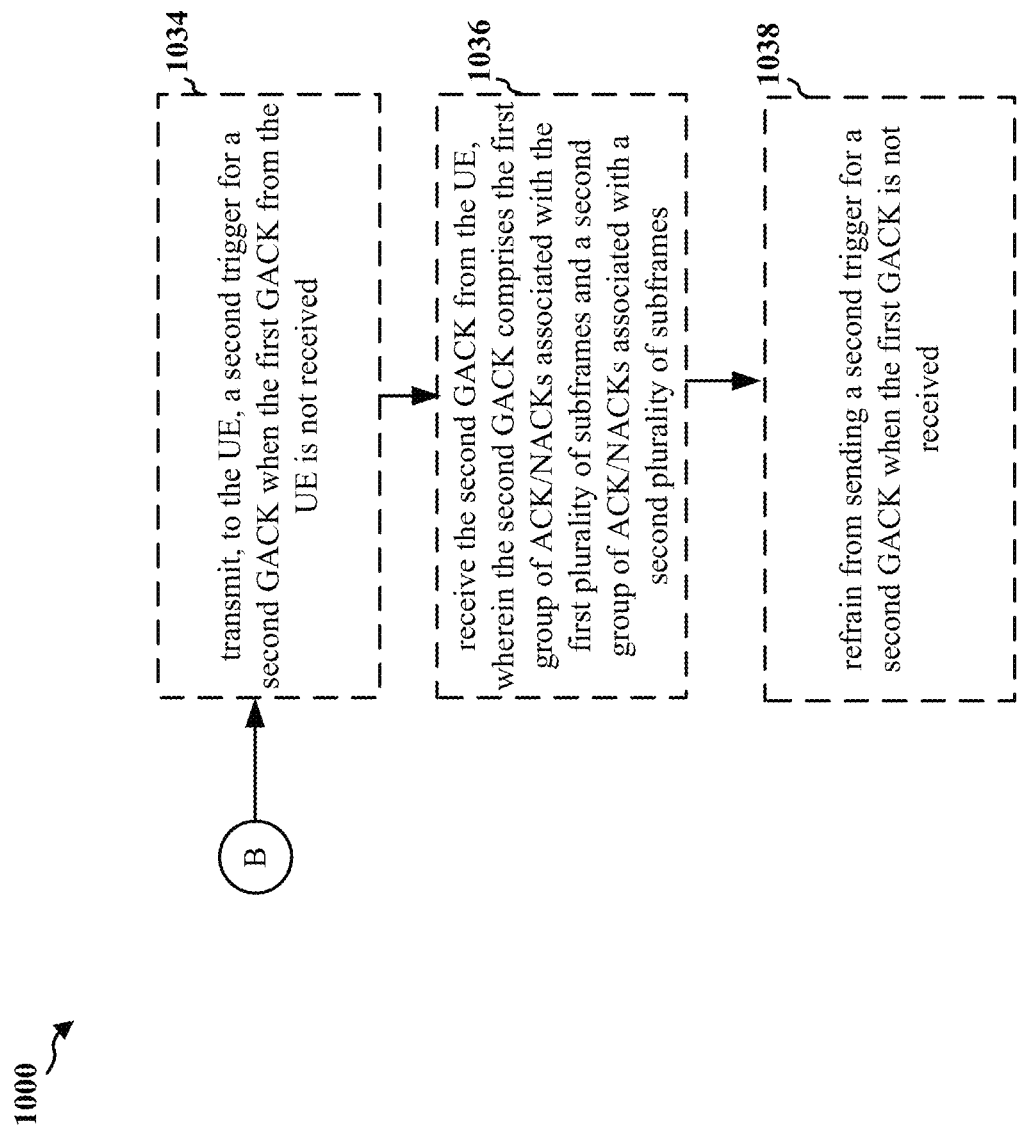

GROUP ACKNOWLEDGEMENT/NEGATIVE ACKNOWLEDGEMENT AND TRIGGERING GACK/CHANNEL STATE INFORMATION

CROSS-REFERENCE TO RELATED APPLICATION(S)

The application is a continuation of U.S. Non-provisional application Ser. No. 16/104,111, entitled "GROUP ACKNOWLEDGEMENT/NEGATIVE ACKNOWLEDGEMENT AND TRIGGERING GACK/CHANNEL STATE INFORMATION" and filed on Aug. 16, 2018, which is a divisional of U.S. Non-Provisional application Ser. No. 15/002,072, "GROUP ACKNOWLEDGEMENT/NEGATIVE ACKNOWLEDGEMENT AND TRIGGERING GACK/CHANNEL STATE INFORMATION" and filed on Jan. 20, 2016, which claims the benefit of U.S. Provisional Application Ser. No. 62/108,487, entitled "GROUP ACKNOWLEDGEMENT/NEGATIVE ACKNOWLEDGEMENT (GACK) AND TRIGGERING GACK/CHANNEL STATE INFORMATION (CSI)" and filed on Jan. 27, 2015, the contents of each of which are expressly incorporated by reference herein in their entirety.

BACKGROUND

Field

The present disclosure relates generally to communication systems, and more particularly, to an acknowledgement/negative acknowledgement handling and triggering of acknowledgement/negative acknowledgement or channel state information (CSI) reporting.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In advanced communications using either a licensed spectrum (e.g., LTE-A) or a listen-before-talk (LBT) frame in an unlicensed spectrum (e.g., licensed assisted access (LAA), and/or MuLTEfire), transmitting hybrid automatic repeat request (HARQ) feedback and/or CSI from a user equipment (UE) to a base station (eNB) using conventional methods may be unreliable and have an undesirable payload size.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In advanced communications, using either the licensed spectrum or unlicensed spectrum, downlink (DL) HARQ feedback may be transmitted from a UE to an eNB in predetermined uplink (UL) subframes. The UE may send CSI to the eNB in either periodic or aperiodic reports. However, transmitting HARQ feedback and/or CSI in this manner may not be reliable if a clear channel assessment (CCA) does not clear, or no UL subframes are available. Moreover, aperiodic CSI reports (A-CSI) may include a large payload, and thus sending large A-CSI reports may be unreliable.

In the present disclosure, CSI and/or a plurality of acknowledgements/negative acknowledgements (ACK/NACKs) related to a group of DL data transmissions from an eNB may be buffered at a UE as a group acknowledgement/negative acknowledgement (GACK) until a downlink control information (DCI) trigger is received from the eNB. Once the DCI trigger is received, the UE may transmit the CSI and/or the GACK to the eNB. In this way, HARQ feedback and/or CSI may be reliably communicated while reducing payload.

In an aspect of the disclosure, a method, a computer-readable medium, and an apparatus are provided. The apparatus may include a base station. In an aspect, the apparatus sends, to a UE, data transmissions associated with a first plurality of downlink subframes. In another aspect, the apparatus increments a counter for each data transmission associated with the first plurality of downlink subframes sent to the UE. In a further aspect, the apparatus transmits, to the UE, a first trigger for a first GACK when the counter is greater than or equal to a threshold. For example, the first trigger may include a first tag and the first GACK may be an ACK of the data transmissions received by the UE.

In an aspect of the disclosure, a method, a computer-readable medium, and an apparatus are provided. The apparatus may include a UE. The apparatus stores a first group of ACK/NACKs corresponding to a first group of data transmissions received in a first plurality of downlink subframes from a base station. In another aspect, the apparatus receives, from the base station, a first trigger for sending a first GACK. For example, the first trigger may include a first tag. In a further aspect, the apparatus transmits, to the base station, a first GACK including at least the first group of ACK/NACKs when the first tag does not correspond to a UE tag.

In an aspect of the disclosure, a method, a computer-readable medium, and an apparatus are provided. The apparatus may include a UE. In an aspect, the apparatus generates uplink control information (UCI). For example, the UCI may include a GACK, a rank indicator (RI), and a CSI transmission. In another aspect, the apparatus may send a UCI transmission in a LBT subframe. For example, the apparatus may generate the UCI by coding and multiplexing the GACK, RI, and CSI separately when the UCI transmission is sent in an enhanced physical uplink shared channel (ePUSCH). In another example, the apparatus may generate the UCI by coding the GACK, RI, and CSI jointly when the UCI transmission is sent in an enhanced physical uplink control channel (ePUCCH).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B are a first diagram for illustrating exemplary embodiments associated with triggering a GACK, CSI, and/or UCI.

FIGS. 7A, 7B, and 7C are a flow chart 1000 of a method of wireless communication in accordance with various aspects.

DETAILED DESCRIPTION

Figure 1:
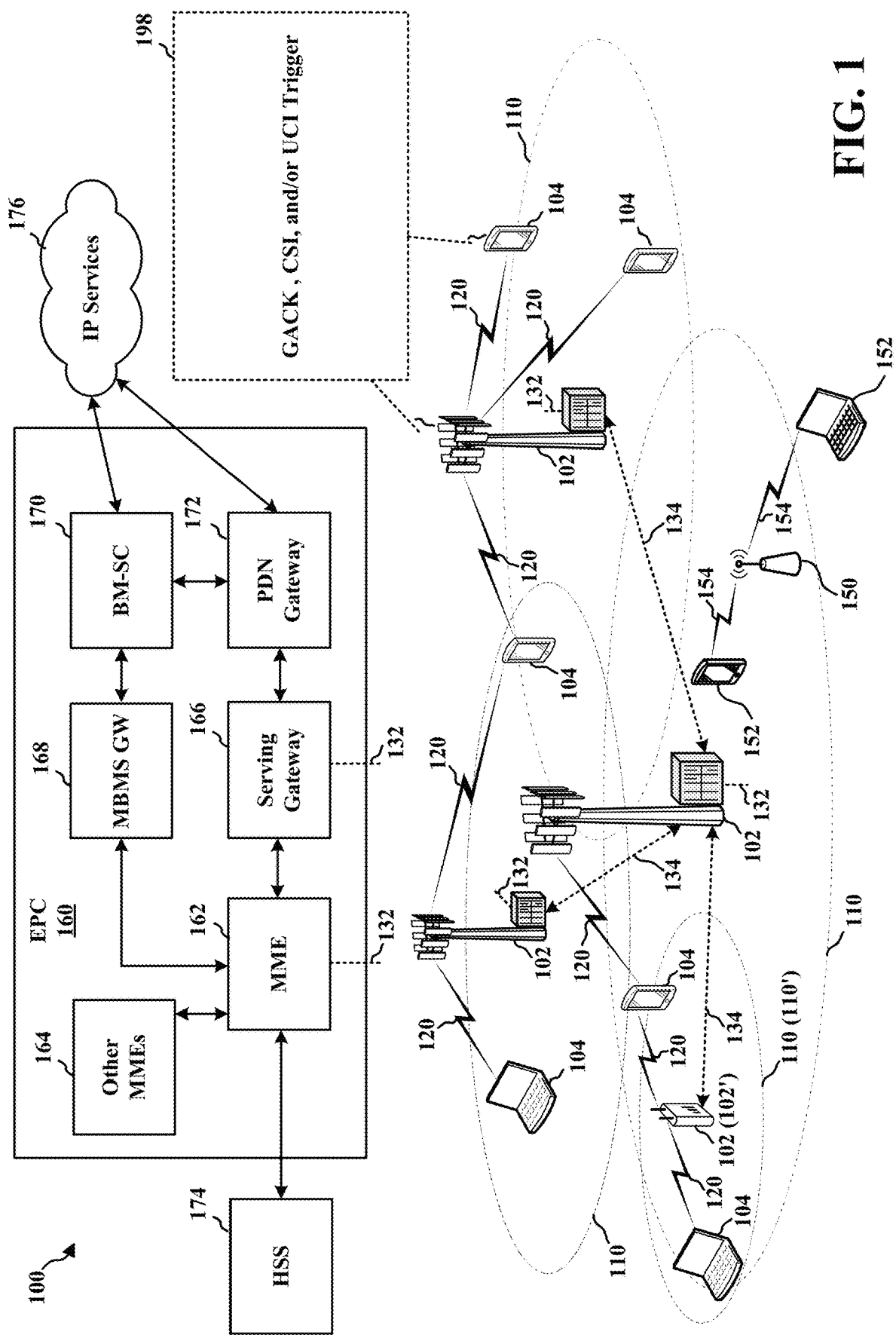
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit, to the base station 102, a GACK, CSI, and/or UCI when a trigger is received (198).

Figure 2:
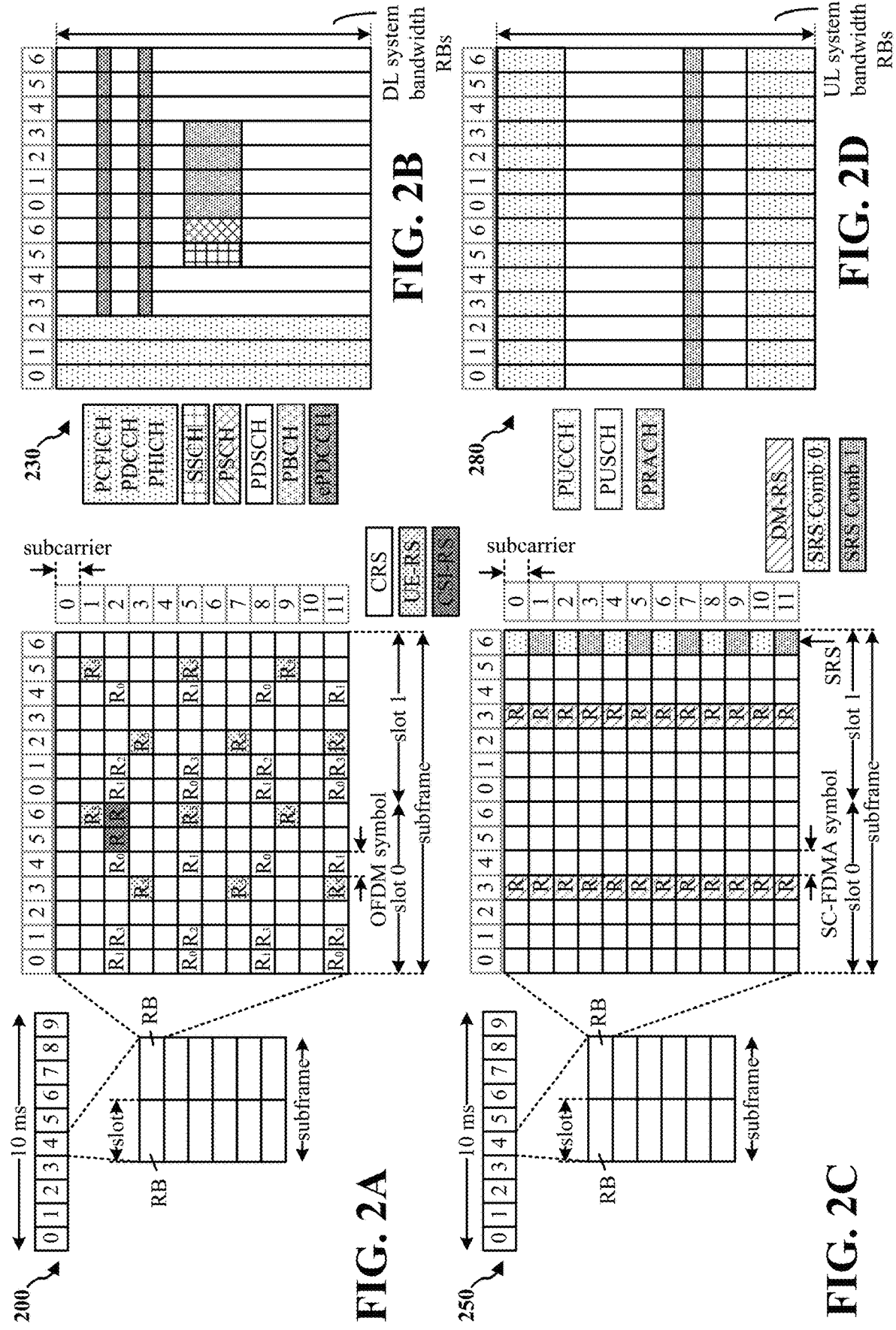
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries DCI within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ ACK/NACK feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries the UCI, such as scheduling requests, a channel quality indicator (CQI), a precoding matrix indicator (PMI), a RI, and HARQ ACK/NACK feedback. The PUSCH carries data, and may additionally be used to carry a buffer status report (BSR), a power headroom report (PHR), and/or UCI.

Figure 3:
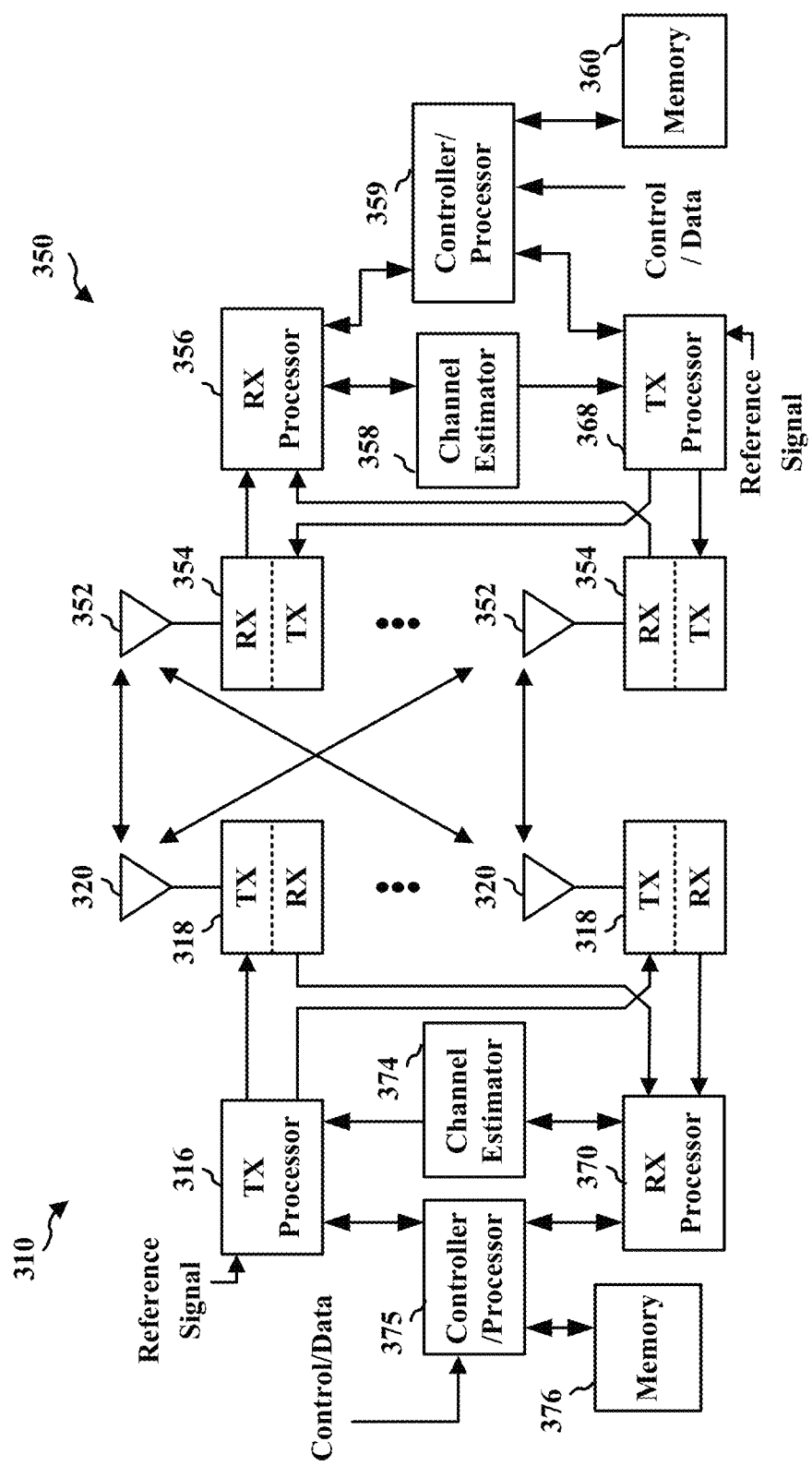
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4B:
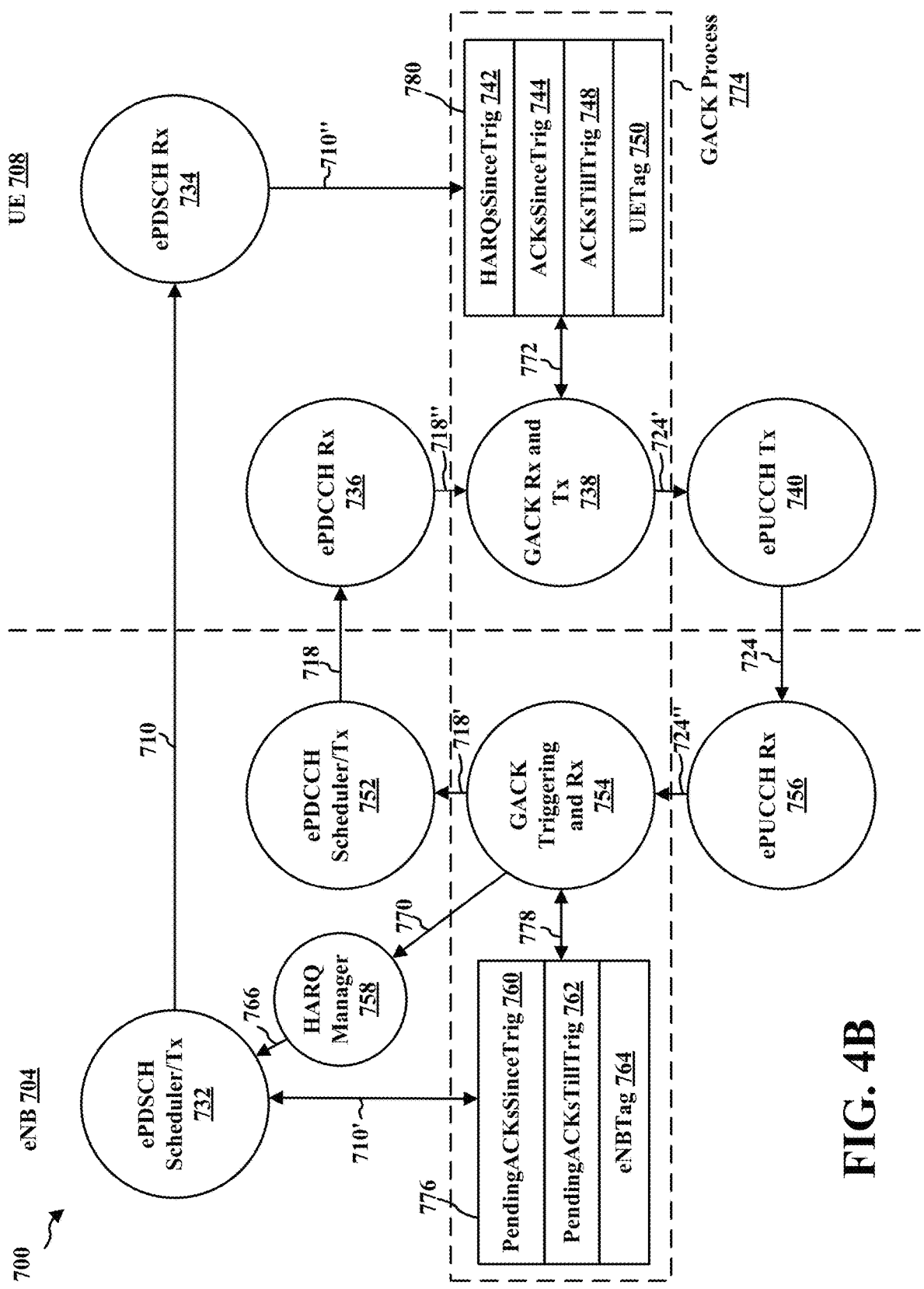

FIGS. 4A and 4B are a diagram 700 for illustrating exemplary embodiments. As illustrated in FIG. 4A, the eNB 704 located in cell 702 may send a first set of data transmissions 710 to the UE 708 in a plurality of DL subframes (e.g., 0, 1, 2, 3, and/or 4) within one or more frames 706 see also FIG. 2). For example, the one or more frames 706 and/or 706' may be radio frames used in licensed spectrum communications or LBT frames used in unlicensed spectrum communications. In an exemplary embodiment, referring to FIG. 4B, the data transmissions 710 may be sent by an enhanced physical downlink shared channel (ePDSCH) scheduler/transmitter 732 in the eNB 704, and be received by an ePDSCH receiver 734 in the UE 708. A signal 710" may be sent from the ePDSCH receiver 734 to the buffer 780 for each data transmission 710 received from the eNB 704. The uplink resources used by the UE 708 in transmitting the GACK 724 may be configured during RRC connection setup. For example, for a group of UEs, each UE in the group receives a group radio network temporary identifier (G-RNTI) and an index within the group, e.g., {0,1, . . . }. The PUCCH resources and/or ePUCCH resources in the UL subframe (e.g., LBT frame) may be configured for each UE based on the index, e.g., {0,1, . . . }. In the unlicensed spectrum, the PUCCH may need to carry more bits to accommodate GACK, CSI, short BSR, etc. Hence the design for LTE is enhanced to carry more bits, which is called ePUCCH.

A UE group grant may be sent in a yet undecided DCI format (e.g., referred to infra as DCI format n) for group triggering. For example, n may be an integer greater than or equal to 1. In such an example, the UE 708 may monitor for an ePDSCH in DL subframes with a G-RNTI four subframes before an ePUCCH configured for transmitting the GACK 724. The frame format may be inferred from the enhanced physical frame format indicator channel (ePFFICH). For example, a value of FS1 for the ePFFICH may be associated with a FDD format, a value of FS2 for the ePFFICH may be associated with a TDD format, and a value of FS3 for the ePFFICH may be associated with the unlicensed spectrum.

A trigger 718 received in DCI format n may include a resource bitmap and data needed for executing the GACK procedures at the UE 708. The resource bitmap may be large enough to include a CSI trigger, GACK trigger, and GACK tag for each UE in the group. For example, a trigger 718 received in DCI format n may include a 3-bit UE specific message, where for a given UE the 3-bit values are positioned at: bit 3*i for CSI trigger, bit (3*i+1) for GACK trigger, bit (3*i+2) for GACK tag, where i may be an index of the UE in the group. The ePUCCH resource configured for sending the GACK 724 for the given UE may be configured based on the number of UEs in the group that are indexed before the given UE. The trigger 718 may be a UE specific trigger that is sent in an UL grant (e.g., in which case the GACK may be sent via an ePUSCH) or a DL grant (e.g., in which case the GACK may be sent via an ePUCCH). In the unlicensed spectrum, the PUSCH resources may be split into interlaces which are a group of non-contiguous RBs to satisfy bandwidth requirements. Thus, the ePUSCH is the PUSCH with the interlace structure for frequency resources.

Referring to FIG. 4B, in one aspect, the eNB 704 may initialize a counter 776 such that eNBTag equals 0 and all pending ACK strings are set to 0. For each data transmission 710 (e.g., Tx) on HARQ processes (k), the eNB 704 may send a signal 710' to increment the counter 776 such that a bit k of PendingAcksSinceTrig 760 is incremented by 1. If the eNB 704 determines that the weight of PendingACKs is greater than or equal to TrigThres, then a signal 778 may be sent to the GACK trigger/receiver 754 that sends a signal 718' to an ePDCCH scheduler/transmitter 752 to transmit a trigger 718. The eNB 704 may transmit the trigger 718, modify the PendingACKsTillTrig to be equal to the PendingACKs, modify the PendingACKsSinceTrig to be equal to 0 and monitor a corresponding ePUCCH (or ePUSCH for DCI format 0) resource for the GACK 724. In one aspect, the trigger 718 may be received by an ePDCCH receiver 736 at the UE 708, and a signal 718" may be sent to the GACK receiver/transmitter 738 which generates the GACK 724 by sending and/or receiving a signal 772 from buffer 780 that buffers HARQsSinceTrig 742, ACKsSinceTrig 744, ACKsTillTrig 748, and/or UETag 750.

The GACK receiver/transmitter 738 may then send a signal 724' to an ePUCCH transmitter 740 that transmits the GACK 724 to the eNB 704 where the GACK 724 may be received at the ePUCCH receiver 756. Once the GACK 724 is received, the ePUCCH receiver 756 may send a signal 724" to the GACK trigger/receiver 754, which may clear PendingACKsTillTrig 762, and flip the eNBTag 764 (e.g., from '0' to '1') by sending a signal 778 to counter 776. The GACK trigger/receiver 754 may also send a signal 770 to HARQ manager 758 that may send information 766 related to the received GACK 742 to the ePDSCH scheduler/transmitter 732. If the GACK 724 is not received, the eNB 704 may send a new trigger. The eNB 704 may choose to schedule new data on pending HARQ process. Some exemplary GACK processes 774 are illustrated within the dashed box in FIG. 4B.

In an exemplary embodiment, the UE 708 may initialize UETag equal to 1 and set all ACK strings to 0-string. The UE 708 may infer an ePUCCH location for sending the GACK 724 from ePFFICH (e.g., which conveys the DL/UL configuration and may be part of the downlink channel usage beacon sequence (D-CUBS)) and trigger 718 messages sent from the eNB 704. When the UE 708 receives a trigger 718, the UE 708 may determine if the UETag is equal to the GACK trigger tag bit. If the UETag is equal to the GACK trigger tag bit, the UE 708 may determine that the previous GACK was not properly received by the eNB 704. Hence the new GACK may be formed using both ACKsTillTrig and ACKsSinceTrig with the ACKsSinceTrig chosen in case same HARQ process appeared before as well as after the trigger. The UE 708 may move a sent GACK to ACKsTillTrig (e.g., effectively incrementing ACKsTillTrig by ACKsSinceTrig) and reset ACKsSinceTrig. However, if UETag does not equal the GACK trigger tag bit, the UE 708 may determine that the previous GACK was successful or that this is first GACK trigger. Here, the new GACK may be formed using ACKsSinceTrig. The UE 708 may modify ACKsTillTrig to be equal the number of ACKs/NACKs in the GACK and set the ACKsSinceTrig to be equal to 0, which resets the ACKsSinceTrig. The UE 708 may flip UETag so that it matches eNBTag, which may ensure synchronization of the GACK trigger tag bit and the UEtag 704 in case of other failures. In one aspect, one or more of the UETag and/or the GACK Trigger bit tag may be any integer and/or a counter to achieve the same result.

According to an exemplary method, the eNB 704 may increment a counter 712 for each data transmission 710 sent to the UE 708 in a DL subframe, and the UE 708 may buffer a first group of ACK/NACKs 716 for the data transmissions 710. For example, the UE 708 may buffer the first group of ACK/NACKs 716 in a first memory location. When the counter 712 reaches or exceeds a threshold (e.g., after a predetermined number of data transmissions 710 have been sent to the UE 708), the eNB 704 may clear the counter 714 and transmit a trigger 718 to the UE 708. In one aspect, the trigger 718 may be for a GACK 724 that includes the first group of ACK/NACKs 716 buffered by the UE 708. In an aspect, the trigger 718 for the GACK 724 may include an eNB tag, and the trigger 718 may be transmitted in a predetermined DL subframe (e.g., PDCCH subframe). The eNB tag may include a value (e.g., '0' or '1'). When the trigger 718 is received, the UE determines whether the eNB tag corresponds to and/or matches an UE tag 720. In another aspect, the trigger 718 may be for UCI.

If the eNB tag does not correspond to the UE tag 720, the UE 708 may determine that either the trigger 718 including the eNB tag is the first trigger received in a GACK process, or that a prior GACK (e.g., the GACK transmitted in subframe 6 in frame 706) was successfully received by the eNB 704 and passed an error detection test. In other words, when the eNB tag does not correspond to the UE tag 720, the UE 708 may transmit a GACK 724 (e.g., the GACK transmitted in UL subframe 6 of frame 706') that includes the first group of ACK/NACKs 716 corresponding to the data transmissions 710 sent by the eNB 704 in DL subframes 0, 1, and 2 in frame 706' and DL subframes 3 and 4 in frame 706. In this first scenario, and as discussed infra with respect to FIG. 5, the UE 708 modifies the UE tag 722 to correspond to the eNB tag.

However, when the eNB tag does correspond to the UE tag, the UE 708 determines that the prior GACK (e.g., the GACK transmitted in UL subframe 6 of frame 706) was not successfully received by the eNB 704 and/or did not pass an error detection test. In this situation, the UE 708 may transmit a GACK 724 (e.g., the GACK transmitted in UL subframe 6 of frame 706') that includes the first group of ACK/NACKs 716 associated with the data transmissions sent in subframes 0, 1, and 2 in frame 706' and subframes 3 and 4 in frame 706, and a second group of ACK/NACKs associated with previous data transmissions sent in subframes 0, 1, and 2 in frame 706. In this second scenario, and as discussed infra with respect to FIG. 6, the UE 708 does not need to modify its UE tag 722 to correspond to the eNB tag included in the trigger, and thus may refrain from modifying the UE tag 722.

In either the first scenario or the second scenario, the UE 708 may move the buffered group of ACK/NACKs 716 from the first memory location to a second memory location. In this way, if the GACK 724 is not properly received and/or fails the error detection test 726, the UE 708 may retransmit this first group of ACK/NACKs 716 in the next GACK 724 along with a second group of ACK/NACKs.

In addition, the UE 708 may include a cyclic redundancy check (CRC) in the GACK that may be used by the eNB 704 in an error detection test 726. In an exemplary embodiment, the DL subframe (e.g., PDCCH or ePDCCH) in which the trigger 718 is transmitted may determine the UL subframe (e.g., PUCCH or ePUCCH) used by the UE 708 to transmit the GACK 724. Assuming that the GACK 724 is transmitted four subframes after the DL subframe that includes the trigger 718, then if the trigger 718 is transmitted by the eNB 704 in DL subframe 2, the UE 708 may transmit a GACK 724 in UL subframe 6 of the same frame. The RRC sublayer may configure specific resources in the DL subframe for the trigger 718, and specific resources in the UL subframe for the GACK 724. In another aspect, the trigger 718 transmitted by the eNB 704 may include a bitmap intended for a group of UEs (not shown in FIGS. 4A and 4B), and each UE 708 may process the bitmap to determine an uplink resource to be used in responding to the trigger 718.

In an aspect, the UE 708 may monitor the specific resources in the DL subframe for the trigger 718, and the eNB 704 may monitor the specific resources in the UL subframe for the GACK 724. When the GACK 724 is received, the eNB 704 may perform an error detection test 726 on the GACK 724. For example, a CRC included in the GACK 724 may be used to perform the error detection test 726 by the eNB 704. If the GACK 724 passes the error detection test 726, then the eNB 704 may generate a new eNB tag 728 to be included in a subsequent trigger, which will indicate to the UE 708 that the GACK 724 was received and passed the error detection test 726. However, if the GACK 724 is not received by the eNB 704 or if the GACK 724 is received but does not pass the error detection test 726, then the eNB 704 may refrain from generating a new eNB tag 728. Instead, the same eNB tag may be included in the subsequent trigger, which may indicate to the UE 708 that the previously transmitted GACK 724 was either not received or failed the error detection test 726.

Alternatively, the eNB 704 has the flexibility to generate a new eNB tag 728 to be included in a subsequent trigger to the UE 708, if the eNB 704 determines that the group of ACK/NACKs 716 in the unreceived or defective GACK 724 are unnecessary. Optionally, the eNB 704 may transmit an ACK to the UE 708 when the GACK 724 passes the error detection test 726, and transmit a NACK to the UE 708 when the GACK 724 is either not received or fails the error detection test 726.

The trigger 718 may cause a false alarm at the UE 708. If the GACK 724 transmitted by the UE 708 includes a 16-bit CRC, the GACK trigger false alarm chance is about 1/65K LBT frames, that is, 1 false alarm every 650 sec. The UE-side result of a GACK trigger false alarm may include that the UE 708 operates on the assumption that the previous GACK succeeded, and thus throws away old ACK/NACK. However, the UE behavior may be corrected after the next successful GACK. In the event of a false alarm, a burst of RLC sublayer interventions (e.g., RLC ARQ) may correct the false alarm.

Alternatively, by increasing the CRC being included in the GACK 724 to 24 bits, or having the eNB 704 send an ACK/NACK to the UE 708 related to the GACK tag, false alarm rates may be reduced. For example, assume the eNB 704 sends a group trigger for group 1, UE1 in group 1 does not get trigger and/or fails a CCA, UE2 in group 2 has a trigger false alarm and transmits a GACK, eNB 704 may decode the GACK as coming from UE1. Here, UE2 may sync up with the eNB 704 after the next successful GACK. Otherwise, this may cause a burst of RLC sublayer interventions (e.g., RLC ARQ). By including a 16-bit CRC in the GACK, the false alarm rate may also be reduced. The UE 708 may follow the eNB 704 at the next time UETag does not match GACK trigger tag. This may cause an infrequent burst of RLC retransmission/duplicates via, for example, RLC ARQ.

In an exemplary embodiment, the UE 708 may send a GACK 724, which may be correctly received by the eNB 704. In one aspect, the eNB 704 may send, to the UE 708, an ACK for the GACK 724 as the GACK trigger tag. This may cause the UE 708 to send 730 a new GACK 724 to the eNB 704. In one scenario, the eNB 704 may monitor for the GACK 724, and when the GACK 724 is received, the GACK 724 may not pass the error detection test (e.g., CRC does not check). Here, if the ACK was sent by the eNB 704 for a previously received GACK, the eNB 704 may not be able to differentiate between when the trigger was not received by the UE 708 and when the CCA failed. For example, the eNB 704 may not be able to determine if the UE 708 did not receive the trigger 718, or if CCA failed and hence the UE 708 did not transmit the GACK 724. The eNB 704 may now repeat the trigger 718, or the eNB 704 may determine not to send a repeat GACK trigger. Otherwise the UE 708 may think latest GACK succeeded. To make the determination, the eNB 704 may need recovery logic (e.g., from RLC sublayer) to deal with this confusion.

A GACK 724 transmission may be sent independently or in combination with A-CSI. For an independent GACK 724 transmission, the payload may be determined by $N_{HARQ}$ x L bits, where $N_{HARQ}$ is the number of HARQ processes, and L is the number of codewords (e.g., L=2 if 2×2 MIMO is used). Some ACK bundling may be used by the UE 708 to reduce the payload, e.g., bundling across codewords. For an A-CSI transmission the complete payload may include RI bits, CQI bits, and/or PMI bits. For transmission in the ePUSCH, a GACK, RI, and A-CSI may be separately coded and multiplexed. Here, resource element allocation may change to increase diversity against bursty interference. For example, different ACK/NACK mapping may be used to obtain time diversity. The way to perform a null TB assignment may be to change the limit in the number of scheduled RBs. For interlace-based LTE-U, the minimum number of RBs may be 10. Thus, a null TB size may be signaled if the number of interlaces is 1 (e.g., 10 RBs).

In transmission in ePUCCH, UCI may be jointly coded (e.g., with CRC addition). However, the payload may or may not be zero-padded. In one aspect, the payload may be zero-padded (e.g. with parity bits) to have same size for different RI values. This may be needed because the UE 708 may send RI and PMI/CQI at the same time. The transmit power at the UE 708 may be determined from the number of bits without padding/parity. In another aspect, the payload may not be zero-padded, and the eNB 704 may have to perform blind decoding for multiple different potential payload sizes.

Figure 5:
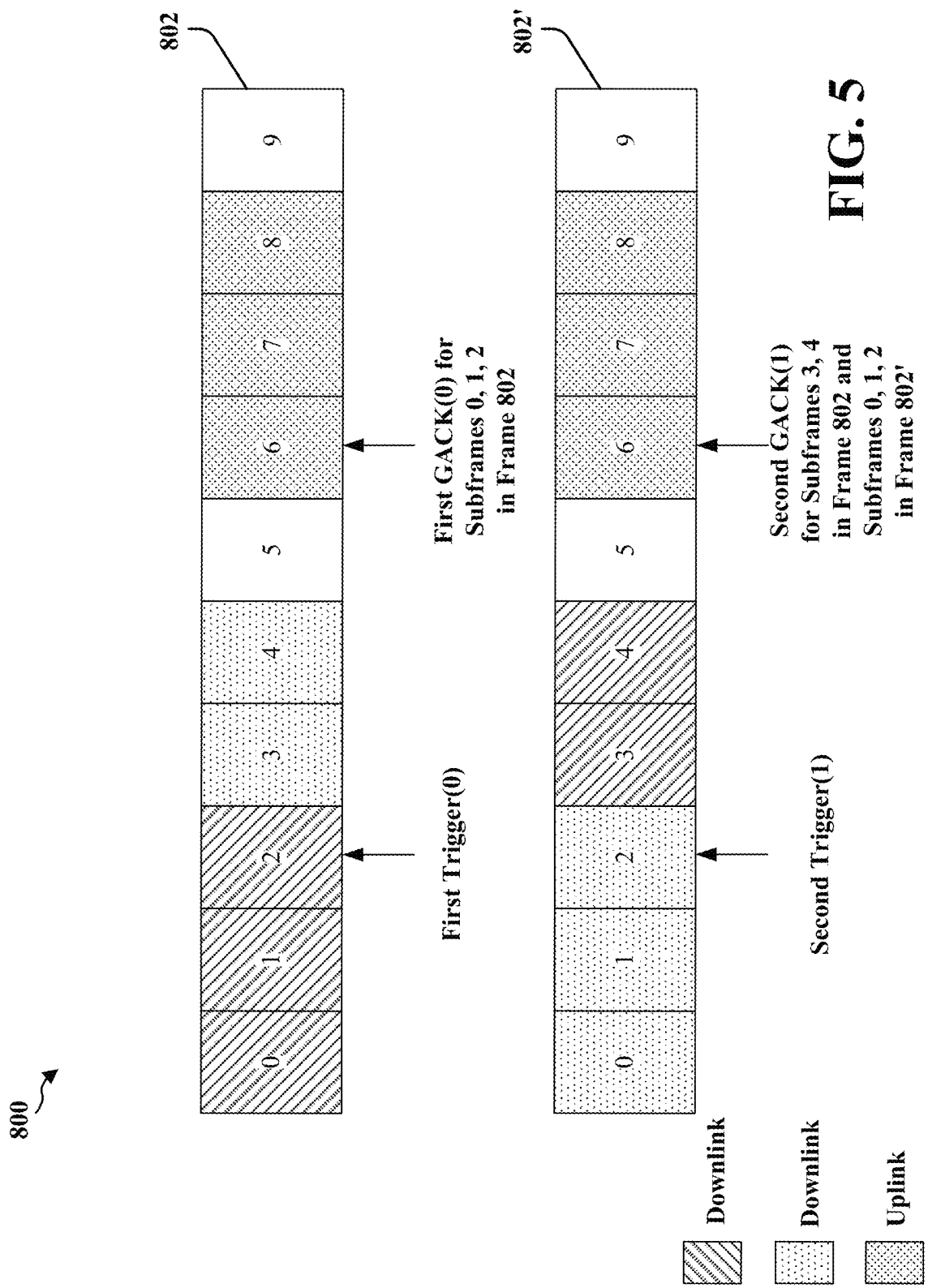
FIG. 5 is a second diagram for illustrating exemplary embodiments associated with triggering a GACK.

FIG. 5 is a second diagram 800 for illustrating exemplary embodiments. As discussed supra, an eNB may send data transmissions to a UE in DL subframes (e.g., 0, 1, 2, 3, and/or 4) in one or more frames 802 and/or 802'. The UE may send transmissions to the eNB in UL subframes (e.g., 6, 7, and 8) in one or more frames 802 and/or 802'. As also discussed supra, the UE may buffer a group of ACK/NACKs associated data transmissions from the eNB until a trigger is received. As shown in FIG. 5, the eNB may transmit a first trigger (e.g., in subframe 2 of frame 802) for a first GACK that includes a first group of ACK/NACKs for data transmissions sent in DL subframes 0, 1, and 2 in frame 802. The first group of ACK/NACKs may be buffered at the UE as PendingUEACKs. In the present example, the eNB tag included in the first trigger has a value of '0'. Assume the UE determines that the UE tag has a value of '1', and thus, does not correspond to the '0' value of the eNB tag included in the first trigger. The UE then transmits the first GACK in UL subframe 6 of frame 802 to the eNB. The first GACK includes the first group of ACK/NACKs associated with the data transmissions sent in DL subframes 0, 1, and 2 in frame 802 (e.g., the PendingUEACKs). In the present example, the UE may modify the value of the UE tag to correspond or match that of the eNB tag received in the first trigger when the first GACK is transmitted. Namely, the value of the UE tag may be modified from '1' to '0'. The modified UE tag may optionally be included in the first GACK for reference by the eNB. In addition, the UE may buffer the first group of ACK/NACKs as SentUEACKs. In the present example, the first GACK is received at the eNB and passes the error detection test. Thus, the eNB may modify the eNB tag so that the eNB tag no longer corresponds to the UE tag. For example, the value of the eNB tag may be modified from '0' to '1'.

In the present example, the eNB sends a second trigger to the UE in subframe 2 of frame 802'. The second trigger being for a second GACK that includes a second group of ACK/NACKs, buffered as PendingUEACKs by the UE, for data transmissions sent in DL subframes 3 and 4 in frame 802 and DL subframes 0, 1, and 2 in frame 802'. Assume the second trigger includes the modified eNB tag value of '1', and that the UE determines that the UE tag has a value of '0' which does not correspond to the eNB tag value of '1'. This indicates to the UE that the first GACK was received and passed the error detection test. Thus, the UE may optionally clear the PendingUEACKs. Moreover, the UE may transmit the second GACK in UL subframe 6 of frame 802'. The second GACK includes the PendingUEACKs for DL subframes 3 and 4 in frame 802 and DL subframes 0, 1, and 2 in frame 802'. Again, the UE modifies the value of the UE tag to '1' to correspond or match that of the eNB tag received in the second trigger when the second GACK is transmitted. The modified value of the UE tag may optionally be included in the second GACK for reference by the eNB. In addition, the UE may buffer PendingUEACKs as SentUEACKs. In this way, the exemplary process may continue so long as the each triggered GACK is received by the eNB and passes the error detection test.

Figure 6:
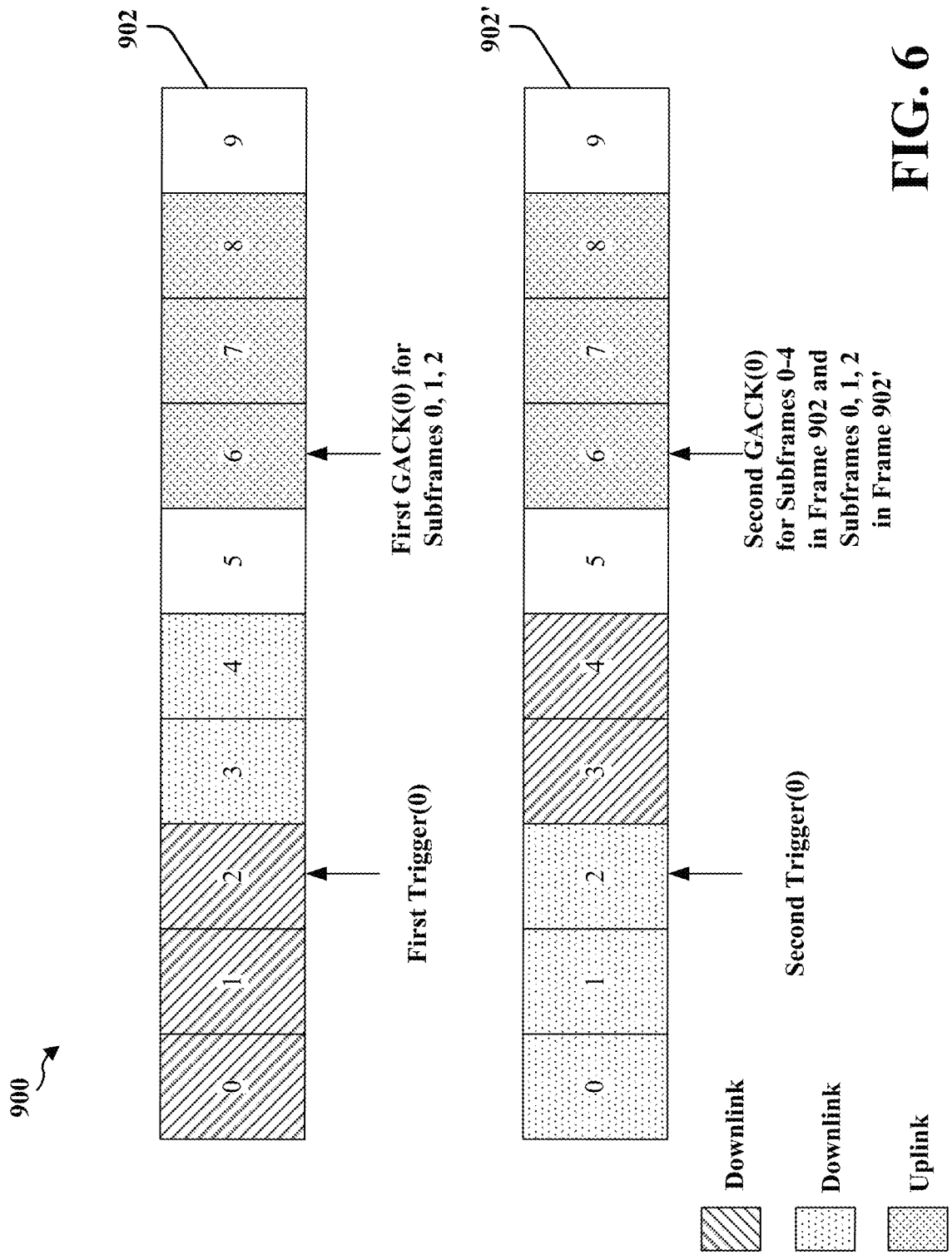
FIG. 6 is a third diagram for illustrating exemplary embodiments associated with triggering a GACK.

FIG. 6 is a third diagram 900 for illustrating exemplary embodiments. As discussed supra, an eNB may send data transmissions to a UE in DL subframes (e.g., 0, 1, 2, 3, and/or 4) in one or more frames 902 and/or 902'. The UE may send transmissions to the eNB in UL subframes (e.g., 6, 7, and 8) in one or more frames 902 and/or 902'. As also discussed supra, the UE may buffer a group of ACK/NACKs associated data transmissions from the eNB until a trigger is received. As shown in FIG. 6, the eNB may transmit a first trigger (e.g., in subframe 2 of frame 902) for a first GACK that includes a first group of ACK/NACKs for data transmissions sent in DL subframes 0, 1, and 2 in frame 902. The first group of ACK/NACKs may be buffered at the UE as PendingUEACKs. In the present example, the eNB tag included in the first trigger has a value of '0'. Assume the UE determines that the UE tag optionally has a value of '1', and thus, does not correspond to the '0' value of the eNB tag included in the first trigger. The UE may transmit the first GACK in UL subframe 6 of frame 902 to the eNB. The first GACK includes the first group of ACK/NACKs associated with the data transmissions sent in DL subframes 0, 1, and 2 in frame 902 (e.g., the PendingUEACKs). In the present example, the UE modifies the value of the UE tag to correspond or match that of the eNB tag received in the first trigger when the first GACK is transmitted. Namely, the value of the UE tag may be modified from '1' to '0'. The modified UE tag may optionally be included in the first GACK for reference by the eNB. In addition, the UE may buffer the PendingUEACKs as SentUEACKs. Assume in this example that the first GACK is either not received by the eNB or does not pass the error detection test. Thus, the eNB does not modify the eNB tag and the eNB tag transmitted in the second trigger may correspond to the UE tag. For example, the value of the eNB tag remains '0'.

In the present example, since the first GACK was not properly received by the eNB, a second trigger is transmitted to the UE in subframe 2 of frame 902' with the eNB value of '0'. The second trigger being for a second GACK that includes a second group of ACK/NACKs (e.g., buffered as PendingUEACKs by the UE) for data transmissions sent in DL subframes 3 and 4 in frame 902 and DL subframes 0, 1, and 2 in frame 902', and for the first group of ACK/NACKs (e.g., now buffered as SentUEACKs by the UE). In the present example, when the second trigger is received, the UE determines that the UE tag has a value of '0' which corresponds to the eNB tag value of '0'. This indicates to the UE that the first GACK was not properly received by the eNB. Thus, the UE transmits the second GACK which includes PendingUEACKs for data transmissions sent in DL subframes 3 and 4 in frame 902 and DL subframes 0, 1, and 2 in frame 902', and the SentUEACKs for data transmissions sent in DL subframes 0, 1, and 2 in frame 902. The second GACK being transmitted in UL subframe 6 of frame 902'. Here, the UE does not modify the '0' value of the UE tag since it already corresponds or matches the value of the eNB tag value of '0' received in the second trigger. The unmodified value of the UE tag may optionally be included in the second GACK for reference by the eNB. In addition, the UE may now buffer the second group of ACK/NACKs as SentUEACKs, so that both the first group of ACK/NACKs and the second group of ACK/NACKs are buffered as SentUEACKs. In this way, the exemplary process may provide redundancy to ensure that all GACKs are properly received and decoded by the eNB.

Figure 7A:
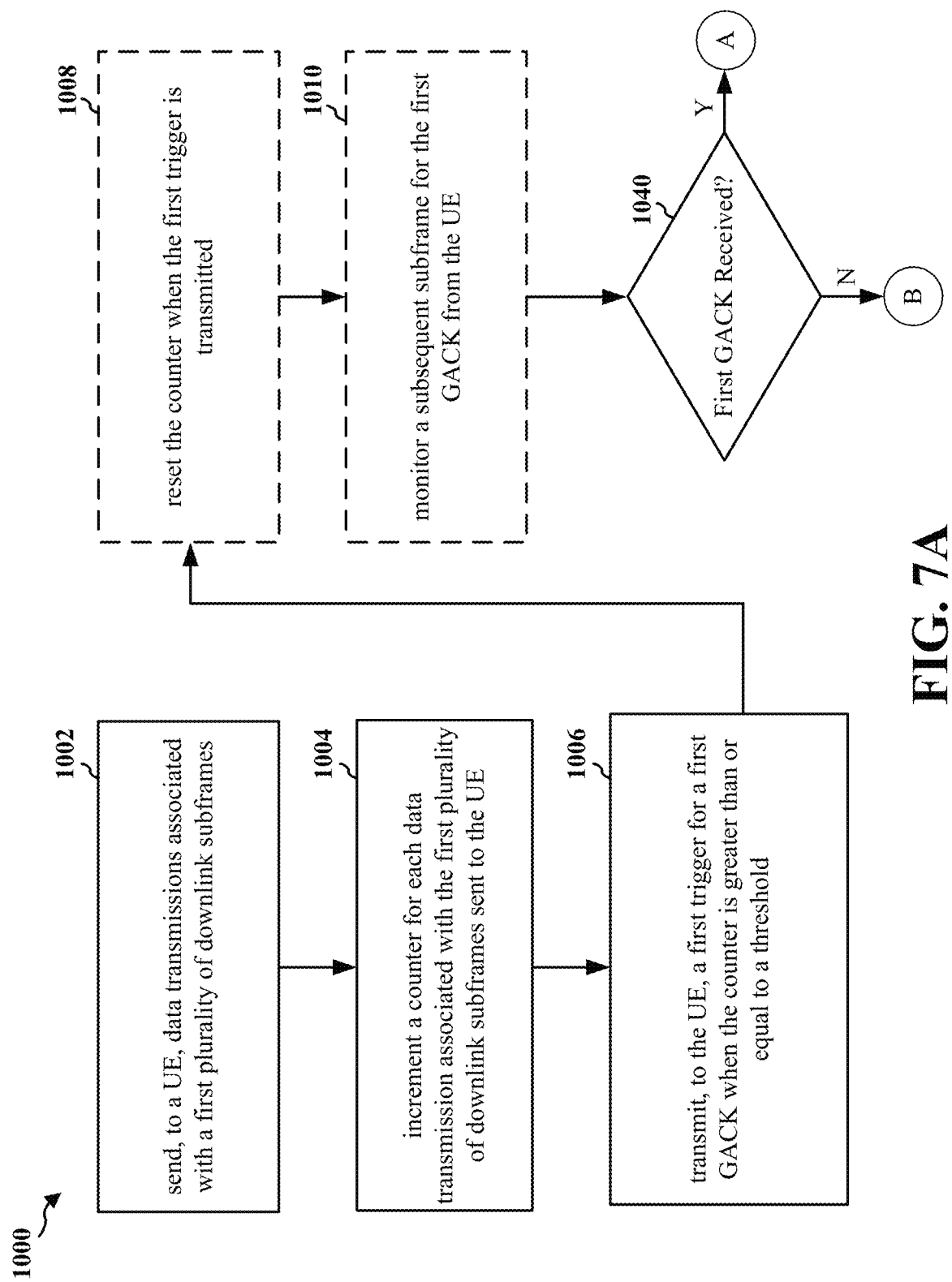
Figure 7B:
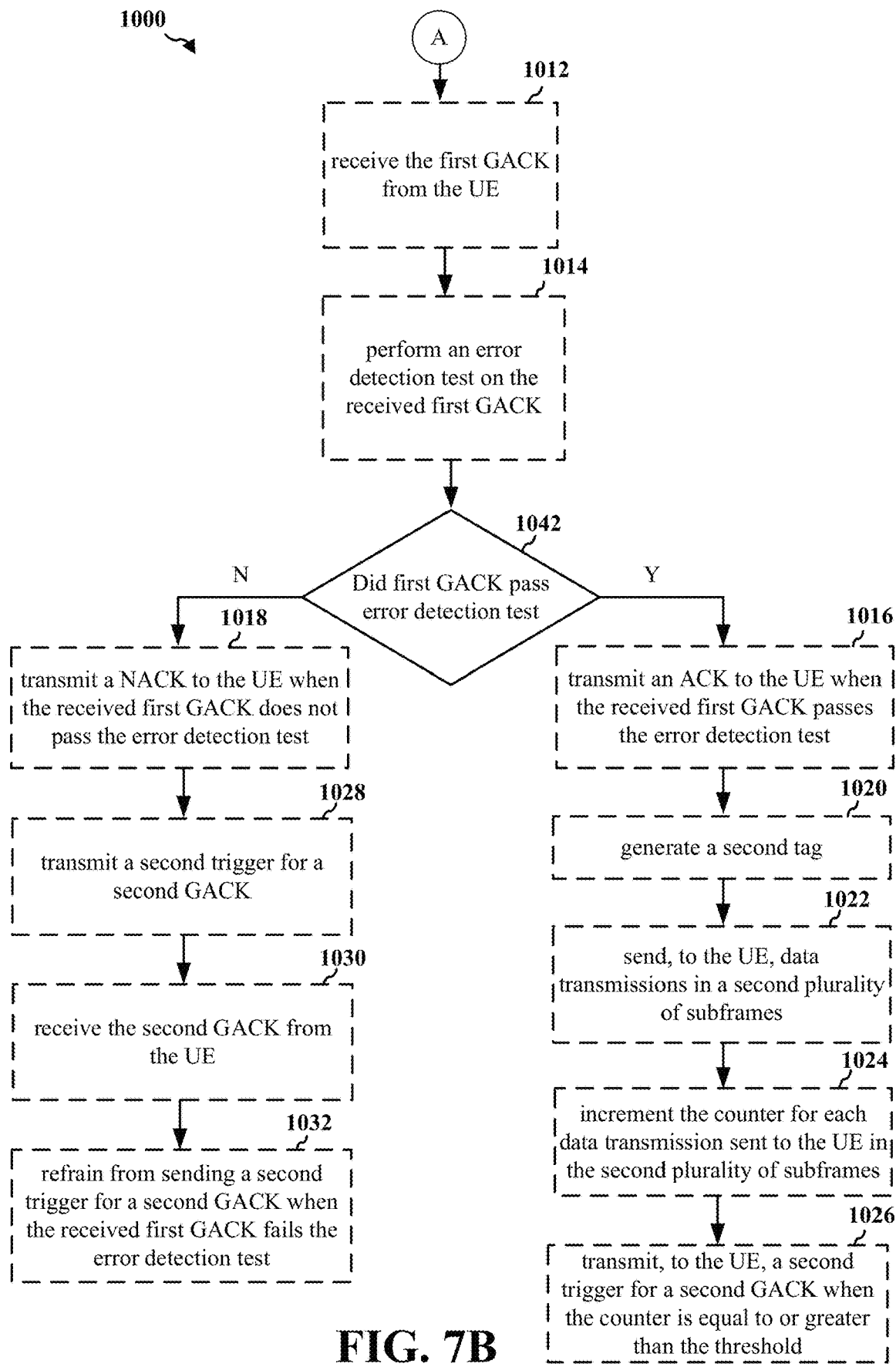

FIGS. 7A-7C are a flow chart 1000 of a method of wireless communication in accordance with various aspects. The method may be performed by a base station/eNB, such as eNB 704. It should be understood that the operations indicated with dashed lines represent optional operations for various aspects of the disclosure.

As shown in FIG. 7A, in step 1002, an eNB sends, to a UE, data transmissions associated with a first plurality of downlink subframes. For example, referring to FIG. 4A, the eNB 704 located in cell 702 may send a first set of data transmissions 710 to the UE 708 in a plurality of DL subframes (e.g., 0, 1, 2, 3, and/or 4) within one or more frames 706 and/or 706'. For example, the one or more frames 706 and/or 706' may be radio frames used in LTE-A communications or LBT frames used in LTE-U communications.

In step 1004, the eNB increments a counter for each data transmission associated with the first plurality of downlink subframes sent to the UE. For example, referring to FIG. 4A, the eNB 704 increments a counter 712 for each data transmission 710 sent to the UE 708 in a DL subframe.

In step 1006, the eNB transmits, to the UE, a first trigger for a first GACK when the counter is greater than or equal to a threshold. The first trigger may include a first tag and the first GACK may include an acknowledgment of the data transmissions received by the UE. For example, referring to FIG. 4A, when the counter 712 reaches or exceeds a threshold (e.g., after a predetermined number of data transmissions 710 have been sent to the UE 708), the eNB 704 transmits a trigger 718 to the UE 708. In one aspect, the trigger 718 may be for a GACK 724 that includes the first group of ACK/NACKs 716 buffered by the UE 708. In an aspect, the trigger 718 for the GACK 724 includes an eNB tag, and the trigger 718 may be transmitted in a predetermined DL subframe (e.g., PDCCH subframe). The eNB tag may include a value (e.g., '0' or '1').

In step 1008, the eNB may reset the counter when the first trigger is transmitted. For example, referring to FIG. 4B, once the GACK trigger is received at the UE 708, the GACK receiver/transmitter 738 may then send a signal 724' to an ePUCCH transmitter 740 that transmits the GACK 724 to the eNB 704 where the GACK 724 may be received at the ePUCCH receiver 756.

In step 1010, the eNB may monitor a subsequent subframe for the first GACK from the UE. For example, referring to FIG. 4A, when the counter 712 reaches or exceeds a threshold (e.g., after a predetermined number of data transmissions 710 have been sent to the UE 708), the eNB 704 clears the counter 714.

In step 1012, the eNB may determine if the first GACK is received in the subsequent subframe. If it is determined that the first GACK is received, the method moves to FIG. 7B. Alternatively, if it is determined that the first GACK is not received, the method moves to FIG. 7C.

As shown in FIG. 7B, in step 1014, the eNB may receive the first GACK from the UE. The received first GACK may include a first group of ACK/NACKs associated with the first plurality of downlink subframes. For example, referring to FIG. 4A, when the GACK 724 is received at the eNB 704, the eNB 704 may clear PendingACKsTillTrig, and flip the eNBTag (e.g., from '0' to '1'). The GACK 724 may include one or more of the first group of ACK/NACKs 716 and/or a second group of ACK/NACKs buffered by the UE 708.

In step 1016, the eNB may perform an error detection test on the received first GACK. For example, referring to FIG. 4A, when the GACK 724 is received, the eNB 704 may perform an error detection test 726 on the GACK 724. For example, a CRC included in the GACK 724 may be used to perform the error detection test 726 by the eNB 704.

In step 1018, the eNB may determine if the first GACK passes the error detection test. If it is determined that the first GACK passes the error detection test, the method moves to step 1020. Alternatively, if it is determined that the first GACK fails the error detection test, the method moves to step 1022.

If the first GACK passes the error detection test, then in step 1020 the eNB may transmit an ACK to the UE when the received first GACK passes the error detection test. For example, referring to FIG. 4A, the eNB 704 may transmit an ACK to the UE 708 when the GACK 724 passes the error detection test 726.

In step 1024, the eNB may generate a second tag. For example, referring to FIG. 4A, if the GACK 724 passes the error detection test 726, then the eNB 704 may generate a new eNB tag 728 to be included in a subsequent trigger, which will indicate to the UE 708 that the GACK 724 was received and passed the error detection test 726.

In step 1026, the eNB may send, to the UE, data transmissions in a second plurality of subframes. For example, referring to FIG. 4A, the eNB 704 located in cell 702 may send a first set of data transmissions 710 to the UE 708 in a plurality of DL subframes (e.g., 0, 1, 2, 3, and/or 4) within one or more frames 706 and/or 706'. For example, the one or more frames 706 and/or 706' may be radio frames used in LTE-A communications or LBT frames used in LTE-U communications.

In step 1028, the eNB may increment the counter for each data transmission sent to the UE in the second plurality of subframes. For example, referring to FIG. 4A, the eNB 704 increments a counter 712 for each data transmission 710 sent to the UE 708 in a DL subframe.

In step 1030, the eNB may transmit, to the UE, a second trigger for a second GACK when the counter is equal to or greater than the threshold. The second GACK may include a second tag and the second GACK may acknowledge the data transmission received by the UE in the second plurality of subframes. For example, referring to FIG. 4A, if the GACK 724 passes the error detection test 726, then the eNB 704 may generate a new eNB tag 728 to be included in a subsequent trigger, which will indicate to the UE 708 that the GACK 724 was received and passed the error detection test 726.

Alternatively, if the first GACK fails the error detection test, then in step 1022 the eNB may transmit a NACK to the UE when the received first GACK does not pass the error detection test. For example, referring to FIG. 4A, the eNB 704 may transmit a NACK to the UE 708 when the GACK 724 is either not received or fails the error detection test 726.

In step 1032, the eNB may transmit, to the UE, a second trigger for a second GACK. For example, the second trigger may include the first tag.

In step 1034, the eNB may receive the second GACK from the UE. The second GACK may include the first group of ACK/NACKs associated with the first plurality of downlink subframes and a second group of ACK/NACKs associated with a second plurality of downlink subframes. For example, referring to FIG. 4A, when the GACK 724 is received at the eNB 704, the eNB 704 may clear PendingACKsTillTrig, and flip the eNBTag (e.g., from '0' to '1'). The GACK 724 may include one or more of the first group of ACK/NACKs 716 and/or a second group of ACK/NACKs buffered by the UE 708.

In step 1036, the eNB may refrain from sending a second trigger for a second GACK when the received first GACK fails the error detection test. For example, referring to FIG. 4A, the eNB 704 may not be able to determine if the UE 708 did not receive the trigger 718, or if CRC failed and hence the UE 708 did not transmit the GACK 724. The eNB 704 may now repeat the trigger 718, or the eNB 704 may determine not to send a repeat GACK trigger. To make the determination, the eNB 704 may need recovery logic (e.g., from RLC sublayer) to deal with this confusion.

If at step 1012 it is determined that the first GACK is not received, then as shown in FIG. 7C, in step 1038 the eNB may transmit, to the UE, a second trigger for a second GACK when the first GACK from the UE is not received. Here, the second trigger includes the first tag. For example, referring to FIG. 4A, if the eNB 704 does not receive the first GACK from the UE 708, the eNB 704 may now repeat the trigger 718, or the eNB 704 may determine not to send a repeat GACK trigger. To make the determination, the eNB 704 may need recovery logic (e.g., from RLC sublayer) to deal with this confusion.

In step 1040, the eNB may receive the second GACK from the UE. The second GACK may include the first group of ACK/NACKs associated with the first plurality of subframes and a second group of ACK/NACKs associated with a second plurality of subframes. For example, referring to FIG. 4A, when the GACK 724 is received at the eNB 704, the eNB 704 may clear PendingACKsTillTrig, and flip the eNBTag (e.g., from '0' to '1'). The GACK 724 may include one or more of the first group of ACK/NACKs 716 and/or a second group of ACK/NACKs buffered by the UE 708.

In step 1042, the eNB may refrain from sending a second trigger for a second GACK when the first GACK is not received. For example, referring to FIG. 4A, if the eNB 704 does not receive the first GACK from the UE 708, the eNB 704 may now repeat the trigger 718, or the eNB 704 may determine not to send a repeat GACK trigger. To make the determination, the eNB 704 may need recovery logic (e.g., from RLC sublayer) to deal with this confusion.

Figure 8:
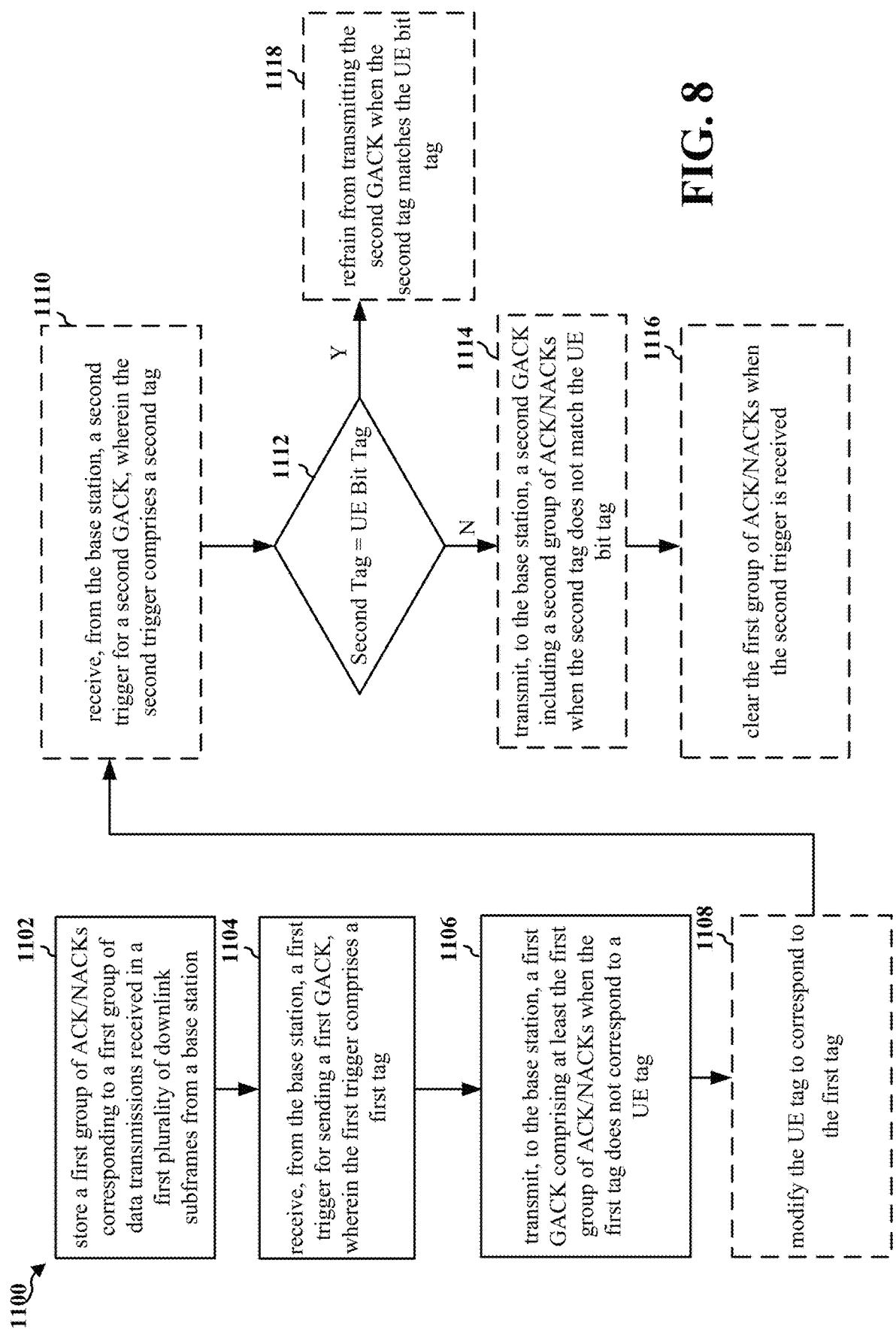
FIG. 8 is a flow chart 1100 of a method of wireless communication in accordance with various aspects.

FIG. 8 is a flow chart 1100 of a method of wireless communication in accordance with various aspects. The method may be performed by a UE/mobile station, such as UE 708. It should be understood that the operations indicated with dashed lines represent optional operations for various aspects of the disclosure.

In step 1102, the UE stores a first group of ACK/NACKs corresponding to a first group of data transmissions received in a first plurality of downlink subframes from a base station. For example, referring to FIG. 4A, the UE 708 may buffer a first group of ACK/NACKs 716 for the data transmissions 710 from the eNB 704.

In step 1104, the UE receives, from the base station, a first trigger for sending a first group GACK. The first trigger may include a first tag. For example, referring to FIG. 4A, the eNB 704 transmits a trigger 718 to the UE 708. In one aspect, the trigger 718 is for a group GACK 724 that includes the first group of ACK/NACKs 716 buffered by the UE 708. In an aspect, the trigger 718 for the GACK 724 includes an eNB tag, and the trigger 718 may be received in a predetermined DL subframe (e.g., PDCCH subframe) by the UE 708. The eNB tag may include a value (e.g., '0' or '1').

In step 1106, the UE transmits, to the base station, a first GACK including at least the first group of ACK/NACKs when the first tag does not correspond to a UE tag. The first GACK may include a cyclic redundancy check.

In step 1108, the UE may modify the UE tag to correspond to the first tag. For example, referring to FIG. 4A, the UE 708 may transmit a GACK 724 that may include one or more of the first group of ACK/NACKs 716 and/or a second group of ACK/NACKs buffered by the UE 708, when the trigger 718 is received by the UE 708.

In step 1110, the UE may receive, from the base station, a second trigger for a second GACK. The second trigger may include a second tag. For example, referring to FIG. 4A, if the GACK 724 passes the error detection test 726, then the eNB 704 may generate a new eNB tag 728 to be included in a subsequent trigger, which will indicate to the UE 708 that the GACK 724 was received and passed the error detection test 726.

In step 1112, the UE may determine if the second tag matches the UE bit tag. If the second tag matches the UE bit tag, then the method moves to step 1118. Alternatively, if the second tag does not match the UE bit tag, then the method moves to step 1114.

For example, if the second tag does not match the UE bit tag, then in step 1114 the UE may transmit, to the base station, a second GACK including a second group of ACK/NACKs when the second tag does not match the UE bit tag. For example, referring to FIG. 4A, the UE 708 may transmit a GACK 724 that can include one or more of the first group of ACK/NACKs 716 and/or a second group of ACK/NACKs buffered by the UE 708, when the trigger 718 is received by the UE 708.

In step 1116, the UE may clear the first group of ACK/NACKs when the second trigger is received. For example, referring to FIG. 4A, assume the second trigger includes the modified eNB tag value of '1', and that the UE determines that the UE tag has a value of '0' which does not correspond to the eNB tag value of '1'. This indicates to the UE that the first GACK was received and passed the error detection test. Thus, the UE may optionally clear the PendingUEACKs.

Alternatively, if the second tag matches the UE bit tag, then at step 1118 the UE may refrain from transmitting the second GACK when the second tag matches the UE bit tag. For example, referring to FIG. 4A, the UE 708 may move the buffered group of ACK/NACKs 716 from the first memory location to a second memory location. In this way, if the GACK 724 is not properly received and/or fails the error detection test 726, the UE 708 may retransmit this first group of ACK/NACKs 716 in the next GACK 724 along with a second group of ACK/NACKs.

Figure 9:
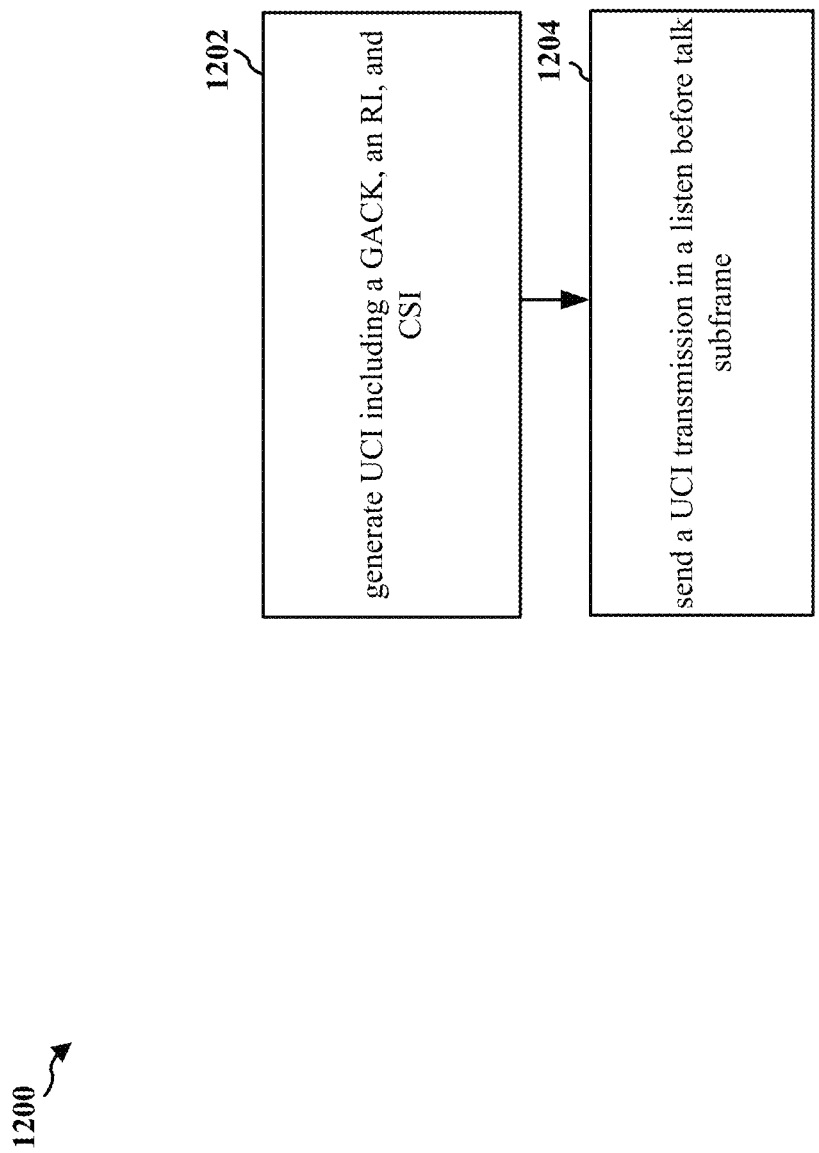
FIG. 9 is a flow chart 1200 of a method of wireless communication in accordance with various aspects.

FIG. 9 is a flow chart 1200 of a method of wireless communication in accordance with various aspects. The method may be performed by a UE/mobile station, such as UE 708.

In step 1202, the UE generates UCI including a GACK, a RI, and CSI. For example, referring to FIG. 4A, for an A-CSI transmission from the UE 708 the complete payload may include RI bits, CQI bits, and/or PMI bits. For transmission in the ePUSCH, a GACK, RI, and A-CSI may be separately coded and multiplexed. Here, resource element allocation may change to increase diversity against bursty interference. For example, different ACK/NACK mapping may be used to obtain time diversity. The way to perform a null TB assignment may be to change the limit in the number of scheduled RB. For interlace-based LTE-U, the minimum number of RB may be 10. Thus, a null TB size may be signaled if the number of interlaces is 1 or 10 RB.

In step 1204, the UE sends a UCI transmission in a LBT subframe. When the UCI transmission is a GACK transmission, a payload of the UCI transmission sent by the UE may include a number of HARQ processes and a number of codewords. When the UCI transmission is a CSI transmission, the payload of the UCI transmission sent by the UE may include two or more jointly coded RI bits, CQI bits, and PMI bits. For example, referring to FIG. 4A, for an A-CSI transmission from the UE 708 the complete payload may include RI bits, CQI bits, and/or PMI bits. For transmission in the ePUSCH, a GACK, RI, and A-CSI may be separately coded and multiplexed. Here, resource element allocation may change to increase diversity against bursty interference. For example, different ACK/NAK mapping may be used to obtain time diversity. The way to perform a null TB assignment, may be to change the limit in the number of scheduled RB. For interlace-based LTE-U, the minimum number of RB is 10. Thus, a null TB size is signaled if the number of interlaces is 1 (e.g., 10 RB).

Figure 10:
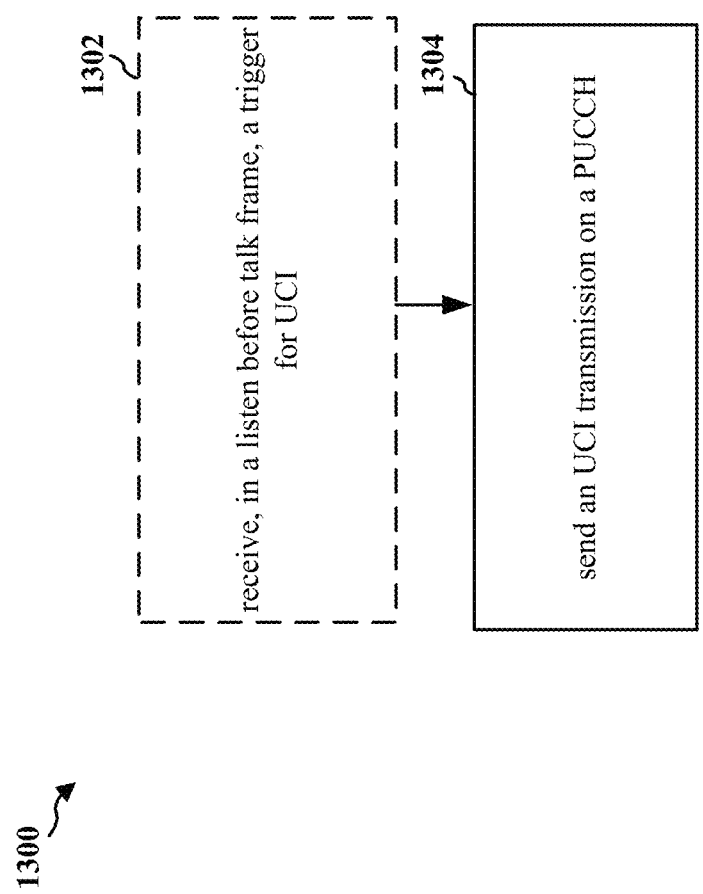
FIG. 10 is a flow chart 1300 of a method of wireless communication in accordance with various aspects.

FIG. 10 is a flow chart 1300 of a method of wireless communication in accordance with various aspects. The method may be performed by a UE/mobile station, such as UE 708. It should be understood that the operations indicated with dashed lines represent optional operations for various aspects of the disclosure.

In step 1302, the UE may receive, in a LBT frame, a trigger for UCI. For example, referring to FIG. 4A, the eNB 704 transmits a trigger 718 to the UE 708. In one aspect, the trigger 718 may be for UCI.

In step 1304, the UE sends an UCI transmission on a PUCCH. The payload of the UCI transmission sent by the UE may include two or more jointly coded GACK bits, CSI bits, RI bits, CQI bits, and PMI bits. For example, referring to FIG. 4A, for an A-CSI transmission from the UE 708 the complete payload may include RI bits, CQI bits, and/or PMI bits. For transmission in the ePUSCH, a GACK, RI, and A-CSI may be separately coded and multiplexed. Here, resource element allocation may change to increase diversity against bursty interference. For example, different ACK/NAK mapping may be used to obtain time diversity. The way to perform a null TB assignment may be to change the limit in the number of scheduled RBs. For interlace-based LTE-U, the minimum number of RBs may be 10. Thus, a null TB size may be signaled if the number of interlaces is 1 (e.g., 10 RBs).

Figure 11:
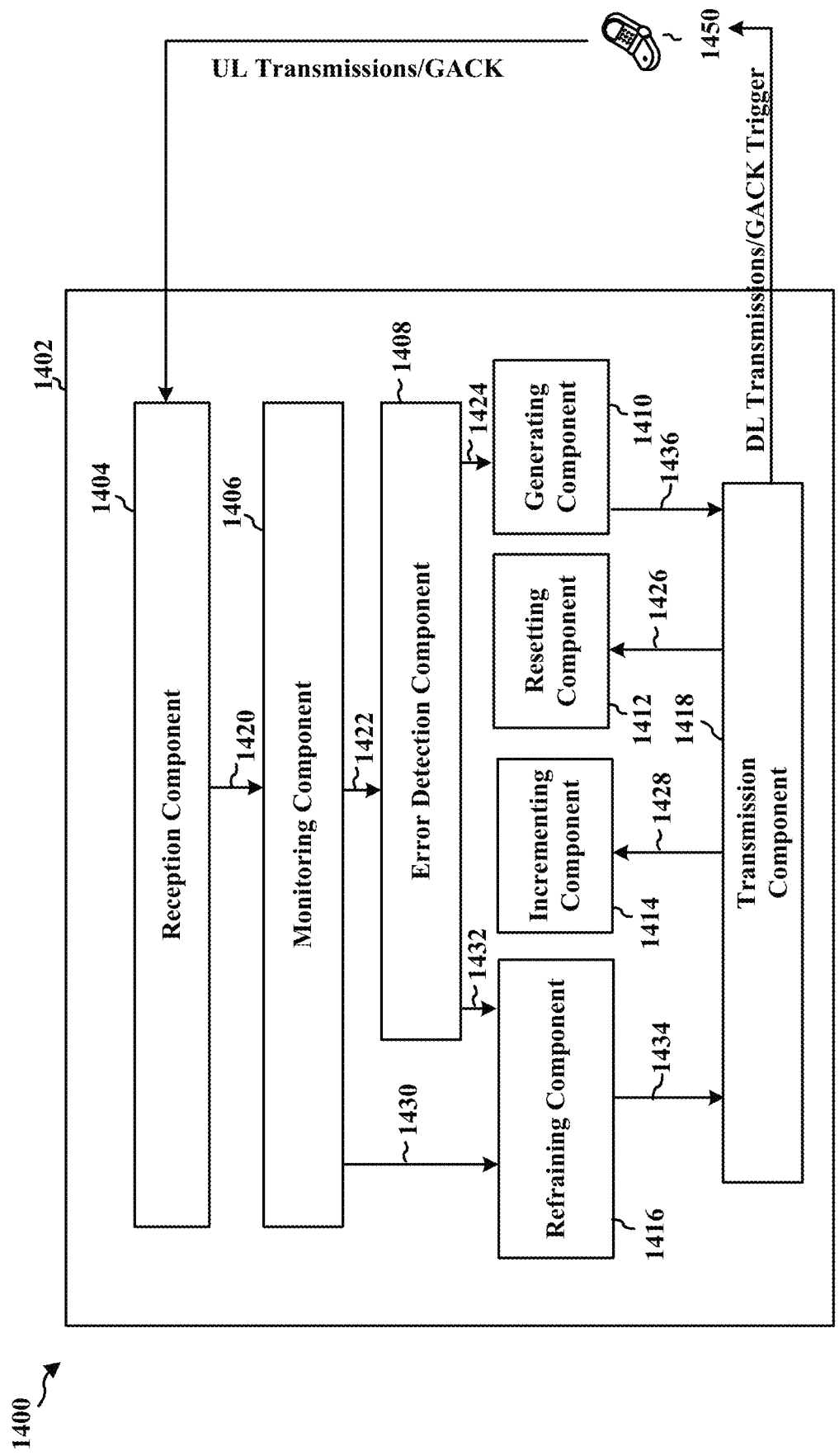
FIG. 11 is a conceptual data flow diagram illustrating the data flow between different means/components in an exemplary system.

FIG. 11 is a conceptual data flow diagram 1400 illustrating the data flow between different means/components in an exemplary apparatus 1402. The apparatus may include an eNB. The apparatus includes a reception component 1404 that may receive UL data transmissions, a first GACK, and/or a second GACK from the UE 1450. In one aspect, the received first GACK may include a first group of ACK/NACKs associated with the first plurality of downlink subframes. In a second aspect, the second GACK may include the first group of ACK/NACKs associated with the first plurality of downlink subframes and a second group of ACK/NACKs associated with a second plurality of downlink subframes. The reception component 1404 may send signals 1420 associated with the DL data transmissions to monitoring component 1406.

The monitoring component 1406 may monitor a subsequent subframe for the first GACK from the UE 1450 based on a GACK trigger being transmitted by transmission component 1418 and UL transmissions received from the UE 1450. If the first GACK is not received in the subsequent subframe, the monitoring component 1406 may send a signal 1430 to refraining component 1416. If the GACK is received in the subsequent subframe, the monitoring component 1406 may send a signal 1422 to the error detection component 1408.

The error detection component 1408 may perform an error detection test on the received first GACK. If the GACK does not pass the error detection test, error detection component 1408 may send a signal 1432 to refraining component 1416. The refraining component 1416 may send a signal 1434 instructing transmission component 1418 to refrain from sending a second trigger for a second GACK when the received first GACK fails the error detection test. For example, the second trigger may include the first tag. In addition, the signal 1434 may instruct refraining component 1418 to refrain from sending a second trigger for a second GACK when the first GACK is not received. For example, the second trigger may include the first tag. A signal 1424 may be sent from error detection component 1408 to generating component 1410 when the GACK passes the error detection test. The generating component 1410 may generate a second tag when the received first GACK passes the error detection test. A signal 1436 including information related to the second tag may be send to transmission component 1418 for inclusion in a subsequent GACK trigger.

The transmission component 1418 may send, to the UE 1450, data transmissions associated with a first plurality of downlink subframes, a first trigger for a first GACK when the counter is greater than or equal to a threshold, an ACK when the received first GACK passes the error detection test, a NACK when the received first GACK does not pass the error detection test, data transmissions in a second plurality of subframes, a second trigger for a second GACK when the counter is equal to or greater than the threshold, a second trigger for a second GACK when the received first GACK fails the error detection test, and/or a second trigger for a second GACK when the first GACK from the UE 1450 is not received. For example, the first trigger sent by transmission component 1418 may include a first tag and the first GACK is an acknowledgment of the data transmissions received by the UE. In another example, the second trigger sent by the transmission component 1418 may include the second tag and the second GACK acknowledges the data transmissions received by the UE in the second plurality of subframes. In a further example, the second trigger sent by transmission component 1418 may include the first tag.

With each DL data transmission sent to the UE 1450, transmission component 1418 may send a signal 1428 to incrementing component 1414. Incrementing component 1414 may increment a counter for each data transmission associated with the first plurality of downlink subframes sent to the UE 1450, and increment the counter for each data transmission sent to the UE 1450 in the second plurality of subframes. When a GACK trigger is sent to the UE 1450, a signal 1426 may be sent to resetting component 1412. Resetting component 1412 may reset the counter when the first trigger is transmitted.

The apparatus may include additional components that perform each of the blocks of the algorithm in the aforementioned flowcharts of FIGS. 7A-7C. As such, each block in the aforementioned flowcharts of FIGS. 7A-7C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
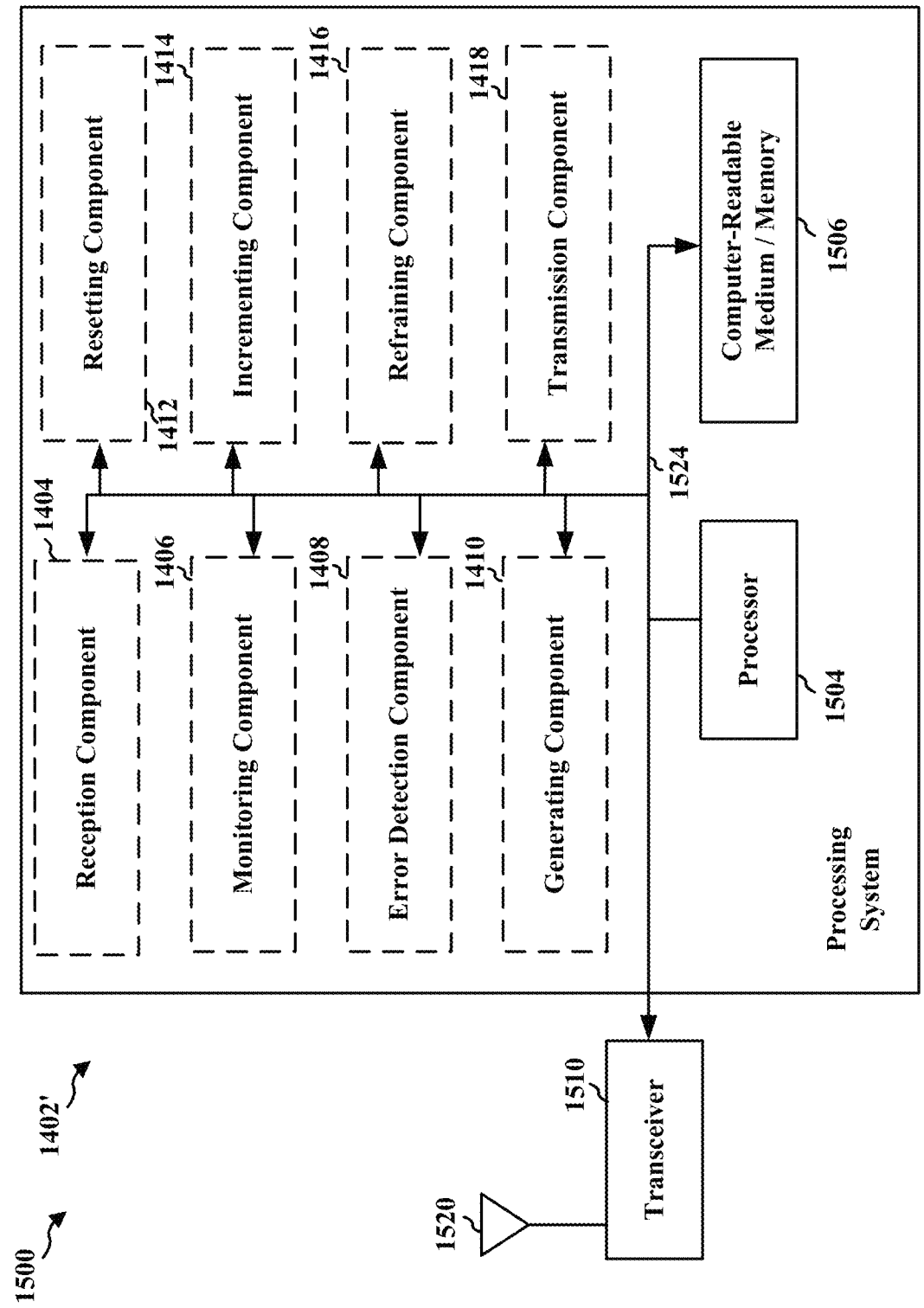
FIG. 12 is a diagram illustrating an example of a hardware implementation for an apparatus employing a processing system.

FIG. 12 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, and 1418, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1418, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, and 1418. The components may be software components running in the processor 1504, resident/stored in the computer readable medium/memory 1506, one or more hardware components coupled to the processor 1504, or some combination thereof. The processing system 1514 may be a component of the eNB 310 and may include the memory 376 and/or at least one of the TX processor 316, the RX processor 370, and the controller/processor 375.

In one configuration, the apparatus 1402/1402' for wireless communication includes means for sending, to a UE, data transmissions associated with a first plurality of downlink subframes. In another aspect, the apparatus 1402/1402' for wireless communication includes means for incrementing a counter for each data transmission associated with the first plurality of downlink subframes sent to the UE. In a further aspect, the apparatus 1402/1402' for wireless communication includes means for transmitting, to the UE, a first trigger for a first GACK when the counter is greater than or equal to a threshold. For example, the first trigger may include a first tag and the first GACK is an acknowledgment of the data transmissions received by the UE. Still further, the apparatus 1402/1402' for wireless communication may further include means for resetting the counter when the first trigger is transmitted. In addition, the apparatus 1402/1402' may include means for monitoring a subsequent subframe for the first GACK from the UE. Moreover, the apparatus 1402/1402' for wireless communication may include means for receiving the first GACK from the UE. For example, the received first GACK may include a first group of ACK/NACKs associated with the first plurality of downlink subframes. Further, the apparatus 1402/1402' for wireless communication may include means for performing an error detection test on the received first GACK. Furthermore, apparatus 1402/1402' for wireless communication may include means for transmitting an ACK to the UE when the received first GACK passes the error detection test. In yet another aspect, the apparatus 1402/1402' for wireless communication may include means for transmitting a NACK to the UE when the received first GACK does not pass the error detection test. In a further aspect, the apparatus 1402/1402' for wireless communication may include means for generating a second tag when the received first GACK passes the error detection test. In another aspect, the apparatus 1402/1402' for wireless communication may include means for sending, to the UE, data transmissions in a second plurality of subframes. In still another aspect, the apparatus 1402/1402' for wireless communication may include means for incrementing the counter for each data transmission sent to the UE in the second plurality of subframes. Moreover, the apparatus 1402/1402' for wireless communication may include means for transmitting, to the UE, a second trigger for a second GACK when the counter is equal to or greater than the threshold. For example, the second trigger may include the second tag and the second GACK acknowledges the data transmissions received by the UE in the second plurality of subframes. Still further, the apparatus 1402/ 1402' for wireless communication may include means for transmitting, to the UE, a second trigger for a second GACK when the received first GACK fails the error detection test. For example, the second trigger may include the first tag. In yet a further aspect, the apparatus 1402/1402' for wireless communication may include means for receiving the second GACK from the UE. For example, the second GACK may include the first group of ACK/NACKs associated with the first plurality of downlink subframes and a second group of ACK/NACKs associated with a second plurality of downlink subframes. Still further, the apparatus 1402/1402' for wireless communication may include means for refraining from sending a second trigger for a second GACK when the received first GACK fails the error detection test. For example, the second trigger may include the first tag. Furthermore, the apparatus 1402/1402' for wireless communication may include means for transmitting, to the UE, a second trigger for a second GACK when the first GACK from the UE is not received. For example, the second trigger includes the first tag. Still further, the apparatus 1402/1402' for wireless communication may include means for refraining from sending a second trigger for a second GACK when the first GACK is not received. For example, the second trigger includes the first tag. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 13:
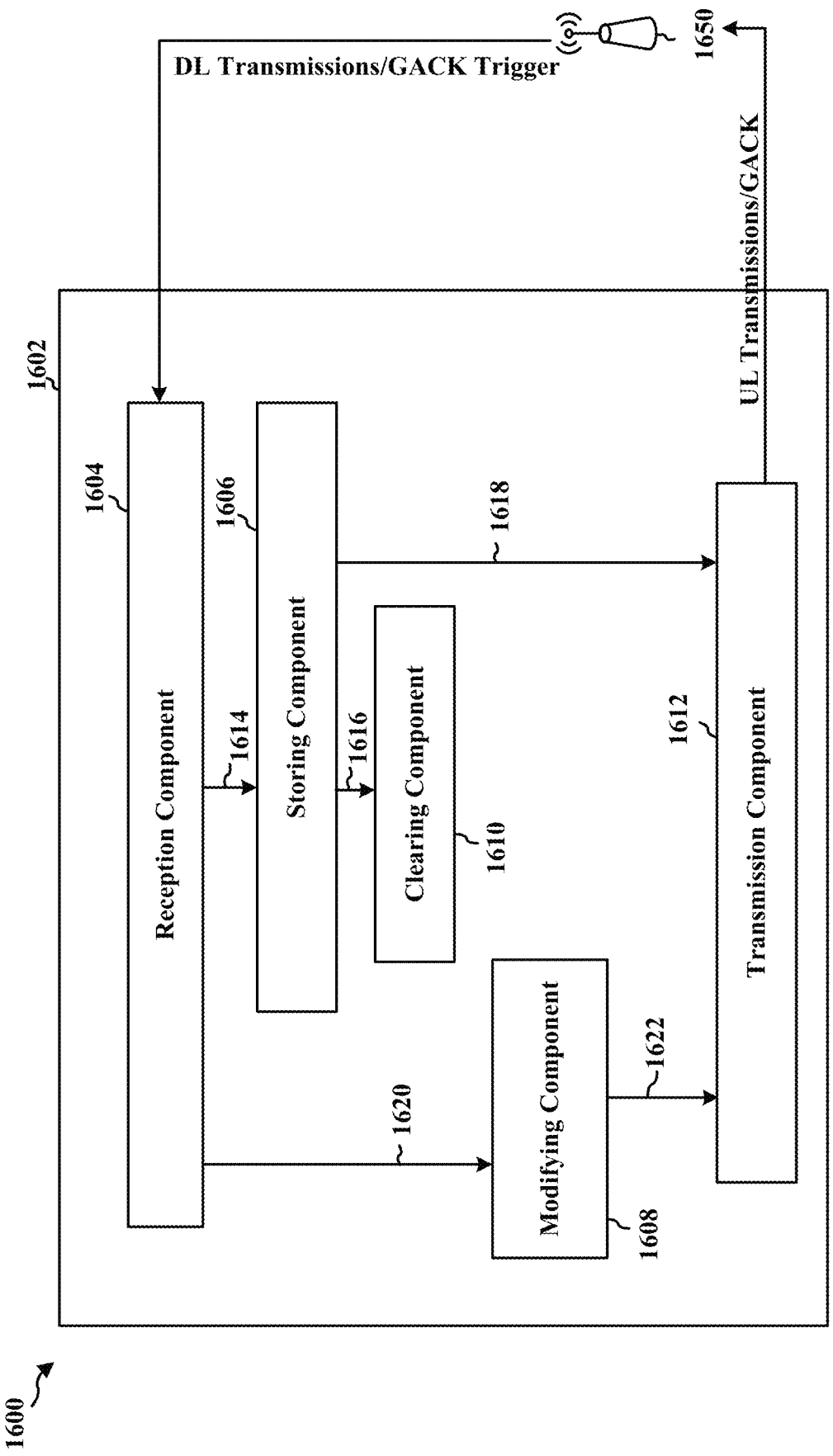
FIG. 13 is a conceptual data flow diagram illustrating the data flow between different means/components in an exemplary apparatus.

FIG. 13 is a conceptual data flow diagram 1600 illustrating the data flow between different means/components in an exemplary apparatus 1602. The apparatus may include a UE. The apparatus includes a reception component 1604 that receives, from the eNB 1650, one or more DL data transmissions, a first trigger for sending a first GACK, a second trigger for a second GACK, and/or a trigger for UCI in an LBT frame. In one aspect, the first trigger may include a first tag. In another aspect, the second trigger may include a second tag.

The reception component 1604 may send signals 1614 related to the DL data transmissions to the storing component 1606. The storing component 1606 may store a first group of ACK/NACKs corresponding to a first group of data transmissions received in a first plurality of downlink subframes from the eNB 1650. The reception component 1604 may also send a signal 1616 including information related to an eNB trigger tag received in a GACK trigger from the eNB 1650 to the clearing component 1610.

The clearing component 1610 may clear the first group of ACK/NACKs when a second trigger is received from the base station 1650. When a GACK trigger is received at reception component 1604, the signal 1614 sent to storing component 1606 may include information related to the GACK trigger, and the storing component 1606 may send a signal 1618 to transmission component 1612. The reception component 1604 may send a signal 1620 to the modifying component 1608 when the GACK trigger is received. The modifying component 1608 may modify the UE tag to correspond to the first tag and send a signal 1622 to the transmission component 1612 associated with the modified UE tag that corresponds to the first tag. The transmission component 1612 may send, to the eNB 1650, one or more of a UCI transmission in an LBT subframe, a UCI transmission on a PUCCH, a first GACK including at least the first group of ACK/NACKs when the first tag does not correspond to a UE tag, a second GACK including a second group of ACK/NACKs when the second tag does not match the UE bit tag, and/or one or more of the first group of ACK/NACKs and a second group of ACK/NACKs when the first tag is equal to the UE tag. In addition, if the first group of ACK/NACKs and the second group of ACK/NACKs corresponds to a same HARQ processes, then the transmission component 1612 may transmit the first group of ACK/NACKs in the first GACK.

The apparatus may include additional components that perform each of the blocks of the algorithm in the aforementioned flowcharts of FIGS. 8-10. As such, each block in the aforementioned flowcharts of FIGS. 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
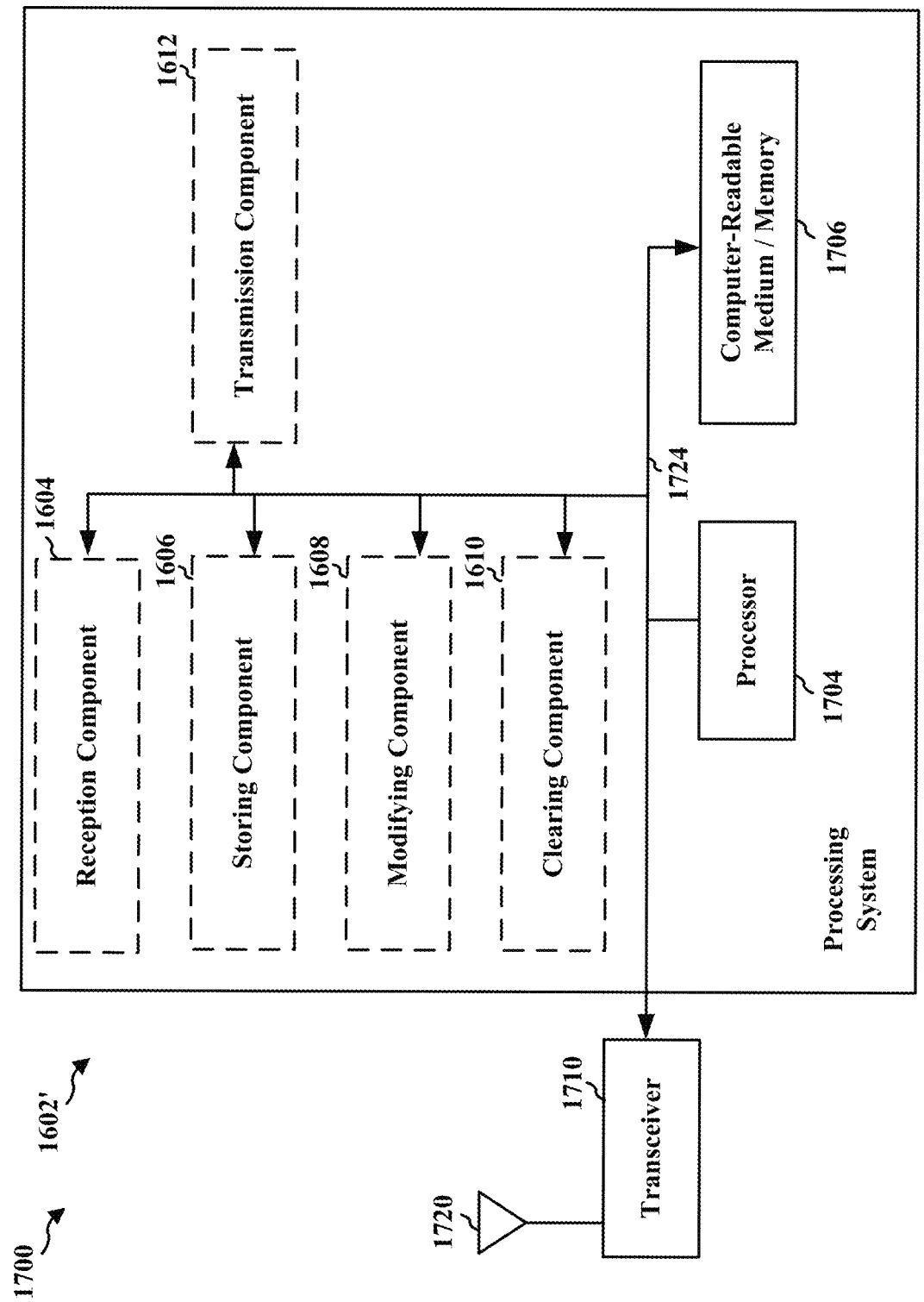
FIG. 14 is a diagram illustrating an example of a hardware implementation for an apparatus employing a processing system.

FIG. 14 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, and 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1612, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, and 1612. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for storing a first group of ACK/NACKs corresponding to a first group of data transmissions received in a first plurality of downlink subframes from a base station. In one aspect, the apparatus 1602/1602' for wireless communication includes means for receiving, from the base station, a first trigger for sending a first GACK. For example, the first trigger may include a first tag, means for transmitting, to the base station, a first GACK including at least the first group of ACK/NACKs when the first tag does not correspond to a UE tag. In another aspect, the apparatus 1602/1602' for wireless communication may include means for modifying the UE tag to correspond to the first tag when the first GACK is transmitted to the base station, means for receiving, from the base station, a second trigger for a second GACK. For example, the second trigger may include a second tag. In a further aspect, the apparatus 1602/1602' for wireless communication may include means for transmitting, to the base station, a second GACK including a second group of ACK/NACKs when the second tag does not match the UE bit tag. Further still, the apparatus 1602/1602' for wireless communication may include means for clearing the first group of ACK/NACKs when the second trigger is received. Furthermore, the apparatus 1602/1602' for wireless communication may include means for transmitting, to the base station, one or more of the first group of ACK/NACKs and a second group of ACK/NACKs when the first tag is equal to the UE tag. Moreover, the apparatus 1602/1602' for wireless communication may include means for transmitting the first group of ACK/NACKs in the first GACK if the first group of ACK/NACKs and the second group of ACK/NACKs corresponds to a same HARQ processes. In yet another aspect, the apparatus 1602/1602' for wireless communication may include means for sending a UCI transmission in a LBT subframe. For example, when the UCI transmission is a GACK transmission, a payload of the UCI transmission may include a number of HARQ processes and a number of codewords. In another example, when the UCI transmission is a CSI transmission, the payload of the UCI transmission may include two or more jointly coded RI bits, CQI bits, and PMI bits. In one aspect, the apparatus 1602/1602' for wireless communication may include means for sending a UCI transmission on a PUCCH. For example, a payload of the UCI transmission includes two or more jointly coded GACK bits, CSI bits, RI bits, CQI bits, and PMI bits. In one aspect, the apparatus 1602/1602' for wireless communication may include means for generating UCI, the UCI including a GACK, an RI, and a CSI transmission. In still a further aspect, the apparatus 1602/1602' for wireless communication may include means for sending a UCI transmission in a LBT subframe. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   generating hybrid automatic repeat request (HARQ) acknowledgement (ACK) information for inclusion in uplink control information (UCI); and
   transmitting the HARQ ACK information on a set of control channel resources configured for the UCI, the set of control channel resources further carrying channel state information (CSI) that includes a rank indicator (RI) and a set of padding bits that is associated with the RI when an instruction to include the CSI with the HARQ ACK information in the UCI is received, wherein the UCI is transmitted on the set of control channel resources with a set of cyclic redundancy check (CRC) bits that is based on the UCI.

2. The method of claim 1, further comprising:
   multiplexing the HARQ ACK information and the CSI in the UCI on the set of control channel resources when the instruction to include the CSI with the HARQ ACK information in the UCI is received.

3. The method of claim 1, wherein the set of control channel resources comprises a physical uplink control channel (PUCCH).

4. The method of claim 1, further comprising:
   receiving downlink control information (DCI),
   wherein the UCI is transmitted further based on the DCI.

5. The method of claim 4, wherein the UCI is transmitted further based on a format of the DCI.

6. The method of claim 1, wherein the HARQ ACK information comprises a number of HARQ processes and a number of codewords.

7. The method of claim 6, wherein the HARQ ACK information comprises a set of bits, and the number of the set of bits is based on the number of HARQ processes.

8. An apparatus for wireless communication, comprising:
   means for generating hybrid automatic repeat request (HARQ) acknowledgement (ACK) information for inclusion in uplink control information (UCI); and
   means for transmitting the HARQ ACK information on a set of control channel resources configured for the UCI, the set of control channel resources further carrying channel state information (CSI) that includes a rank indicator (RI) and a set of padding bits that is associated with the RI when an instruction to include the CSI with the HARQ ACK information in the UCI is received, wherein the UCI is transmitted on the set of control channel resources with a set of cyclic redundancy check (CRC) bits that is based on the UCI.

9. The apparatus of claim 8, further comprising:
   means for multiplexing the HARQ ACK information and the CSI in the UCI on the set of control channel resources when the instruction to include the CSI with the HARQ ACK information in the UCI is received.

10. The apparatus of claim 8, wherein the set of control channel resources comprises a physical uplink control channel (PUCCH).

11. The apparatus of claim 8, further comprising:
    means for receiving downlink control information (DCI),
    wherein the UCI is transmitted further based on the DCI.

12. The apparatus of claim 11, wherein the UCI is transmitted further based on a format of the DCI.

13. The apparatus of claim 8, wherein the HARQ ACK information comprises a number of HARQ processes and a number of codewords.

14. The apparatus of claim 13, wherein the HARQ ACK information comprises a set of bits, and the number of the set of bits is based on the number of HARQ processes.

15. An apparatus of wireless communication, comprising:
    a memory; and
    at least one processor coupled to the memory and configured to:
    generate uplink control information (UCI), the UCI including at least one of hybrid automatic repeat request (HARQ) acknowledgement (ACK) information for inclusion in uplink control information (UCI); and
    transmit the HARQ ACK information on a set of control channel resources configured for the UCI, the set of control channel resources further carrying channel state information (CSI) that includes a rank indicator (RI) and a set of padding bits that is associated with the RI when an instruction to include the CSI with the HARQ ACK information in the UCI is received, wherein the UCI is transmitted on the set of control channel resources with a set of cyclic redundancy check (CRC) bits that is based on the UCI.

16. The apparatus of claim 15, wherein the at least one processor is further configured to:
   multiplex the HARQ ACK information and the CSI in the UCI on the set of control channel resources when the instruction to include the CSI with the HARQ ACK information in the UCI is received.

17. The apparatus of claim 15, wherein the set of control channel resources comprises a physical uplink control channel (PUCCH).

18. The apparatus of claim 15, wherein the at least one processor is further configured to:
   receive downlink control information (DCI),
   wherein the UCI is transmitted further based on the DCI.

19. The apparatus of claim 18, wherein the UCI is transmitted further based on a format of the DCI.

20. The apparatus of claim 15, wherein the HARQ ACK information comprises a number of HARQ processes and a number of codewords.

21. The apparatus of claim 20, wherein the HARQ ACK information comprises a set of bits, and the number of the set of bits is based on the number of HARQ processes.

22. A computer-readable medium storing computer-executable code for wireless communication, when executed by at least one processor, the code configured to cause the at least one processor to:
   generate hybrid automatic repeat request (HARQ) acknowledgement (ACK) information for inclusion in uplink control information (UCI); and
   transmit the HARQ ACK information on a set of control channel resources configured for the UCI, the set of control channel resources further carrying channel state information (CSI) that includes a rank indicator (RI) and a set of padding bits that is associated with the RI when an instruction to include the CSI with the HARQ ACK information in the UCI on the set of control channel resources is received, wherein the UCI is transmitted on the set of control channel resources with a set of cyclic redundancy check (CRC) bits that is based on the UCI.

23. The method of claim 1, wherein the UCI on the set of control channel resources further indicates a scheduling request (SR).

24. The method of claim 1, wherein the CSI is absent from the set of control channel resources configured for the UCI when the instruction is not received.

25. The method of claim 1, further comprising:
   receiving the instruction from a base station.

\* \* \* \* \*